(12) United States Patent
Yarabolu

(10) Patent No.: US 11,256,795 B2
(45) Date of Patent: Feb. 22, 2022

(54) GRAPHICAL USER INTERFACE FOR GENERATION AND VALIDATION OF SECURE AUTHENTICATION CODES

(71) Applicant: BANK OF AMERICA CORPORATION, Charlotte, NC (US)

(72) Inventor: Vijay Kumar Yarabolu, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 70 days.

(21) Appl. No.: 16/900,041

(22) Filed: Jun. 12, 2020

(65) Prior Publication Data
US 2021/0390168 A1 Dec. 16, 2021

(51) Int. Cl.
*G06F 21/36* (2013.01)
*G06F 21/44* (2013.01)
*G06F 21/46* (2013.01)
*H04L 9/06* (2006.01)
*H04L 9/08* (2006.01)

(52) U.S. Cl.
CPC .......... *G06F 21/36* (2013.01); *G06F 21/44* (2013.01); *G06F 21/46* (2013.01); *H04L 9/0643* (2013.01); *H04L 9/0869* (2013.01)

(58) Field of Classification Search
CPC .......... G06F 21/36; G06F 21/44; G06F 21/46; H04L 9/0643
See application file for complete search history.

(56) References Cited

U.S. PATENT DOCUMENTS

| | | | |
|---|---|---|---|
| 9,355,239 B2 | 5/2016 | Bandyopadhyay et al. | |
| 9,946,891 B2 | 4/2018 | Bandyopadhyay et al. | |
| 2008/0148186 A1* | 6/2008 | Krishnamurthy | G06F 21/36 715/840 |
| 2014/0165169 A1* | 6/2014 | Buck | G06F 21/46 726/7 |
| 2015/0047007 A1* | 2/2015 | Colnot | H04L 63/10 726/7 |
| 2016/0092877 A1* | 3/2016 | Chew | G06Q 20/4012 705/72 |
| 2018/0285549 A1* | 10/2018 | Sonkar | G06Q 20/40145 |
| 2019/0258829 A1* | 8/2019 | Pitel | H04L 9/32 |
| 2020/0201981 A1* | 6/2020 | Wardman | G06F 21/44 |

* cited by examiner

*Primary Examiner* — Catherine Thiaw
(74) *Attorney, Agent, or Firm* — Moore & Van Allen PLLC; Nicholas C. Russell

(57) ABSTRACT

Embodiments of the invention are directed to a system, method, or computer program product structured for generation and validation of secure authentication codes. In some embodiments, the system is structured for fetching screen coordinates for a user device, generating a keypad layout, and numbering the keypad layout to produce an authentication keypad. The system is also structured for generating an authentication string, generating a final authentication code hash from the authentication string and a pattern of the authentication string as input into the authentication keypad, and transmitting the authentication keypad and authentication string to a user device. The system is further structured for generating a captured authentication code hash from a captured string and a captured pattern, comparing the final authentication code hash to the captured authentication code hash, and if the final authentication code hash matches the captured authentication code hash, transmitting a session token to a user device.

20 Claims, 11 Drawing Sheets

GRAPHICAL USER INTERFACE FOR GENERATION AND VALIDATION OF SECURE AUTHENTICATION CODES

BACKGROUND

An entity may store sensitive or secure information relating to a user. Accordingly, for a user to view a portion of the sensitive or secure information, the entity may need to authenticate the user. In some cases, this authentication process may involve two-factor authentication, where the user is required to input something the user knows, such as a username and password, as well as confirm that the user is in possession of something the user has, such as a personal user device like a cellphone. Confirming that the user is in possession of the personal user device may require the user to enter an authentication code sent to the personal user device. As such, there is a need for a system that generates and validates authentication codes in a secure manner.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products, and methods for generation and validation of secure authentication codes. In some instances, the system comprises: a memory device with computer-readable program code stored thereon; a communication device; and a processing device operatively coupled to the memory device and communication device, wherein the processing device is configured to execute the computer-readable program code to: fetch screen coordinates for a first user device; generate a keypad layout; number the keypad layout to produce an authentication keypad; generate an authentication string, wherein the authentication string is a series of alphanumeric characters; generate a final authentication code hash from the authentication string and a pattern of the authentication string as theoretically input into the authentication keypad; transmit the authentication keypad to the first user device; transmit the authentication string to a second user device; generate a captured authentication code hash from a captured string and a captured pattern, wherein the captured string is a series of alphanumeric characters input by a user into the authentication keypad and the captured pattern is a pattern of the captured string as input by the user into the authentication keypad; compare the final authentication code hash to the captured authentication code hash; and in response to the final authentication code hash matching the captured authentication code hash, transmit a session token to the first user device or the second user device.

In some embodiments, or in combination with any of the previous embodiments, fetching the screen coordinates comprises determining specifications of a display screen of the first user device.

In some embodiments, or in combination with any of the previous embodiments, the authentication string is a randomly-generated number of N length.

In some embodiments, or in combination with any of the previous embodiments, the invention is further configured to: determine a first set of hashes comprising a hash of a distance between each two consecutive alphanumeric characters of the authentication string on the authentication keypad; sum the hashes in the first set of hashes to produce a first sum; generate a hash of the first sum to produce an authentication pattern hash that is used to generate the final authentication code hash; determine a second set of hashes comprising a hash of a distance between each two consecutive alphanumeric characters of the captured string as input by the user into the authentication keypad; sum the hashes in the second set of hashes to produce a second sum; and generate a hash of the second sum to produce a captured pattern hash that is used to generate the captured authentication code hash.

In some embodiments, or in combination with any of the previous embodiments, the distance between each two consecutive alphanumeric characters of the authentication string on the authentication keypad and the distance between each two consecutive alphanumeric characters of the captured string as input by the user into the authentication keypad are measured in one of pixels, United States customary units, metric units, or display screen percentage.

In some embodiments, or in combination with any of the previous embodiments, the distance between each two consecutive alphanumeric characters of the authentication string on the authentication keypad and the distance between each two consecutive alphanumeric characters of the captured string as input by the user into the authentication keypad is a normalized distance that compensates for a dimension of a display screen of the first user device.

In some embodiments, or in combination with any of the previous embodiments, generating the final authentication code hash comprises: generating a first hash of the authentication string; generating a second hash of the pattern of the authentication string; and generating a hash of a sum of the first hash and the second hash.

In some embodiments, or in combination with any of the previous embodiments, generating the captured authentication code hash comprises: generating a third hash of the captured string; generating a fourth hash of the captured pattern; and generating a hash of a sum of the third hash and the fourth hash.

In some embodiments, or in combination with any of the previous embodiments, the first user device is the same as the second user device.

In some embodiments, or in combination with any of the previous embodiments, the first user device is different from the second user device.

In some embodiments, or in combination with any of the previous embodiments, generating the captured authentication code hash comprises: receiving the captured string and the captured pattern from the first user device; and determining the captured authentication code hash based on the received captured string and received captured pattern.

In some embodiments, or in combination with any of the previous embodiments, generating the captured authentication code hash comprises receiving the captured authentication code hash from the first user device.

In some embodiments, or in combination with any of the previous embodiments, the invention is further configured to: receive a first-factor authentication input from the first user device or the second user device; and verify an accuracy of the first-factor authentication input, wherein the processing device is configured to fetch the screen coordinates for the user device in response to successful verification of the first-factor authentication input.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
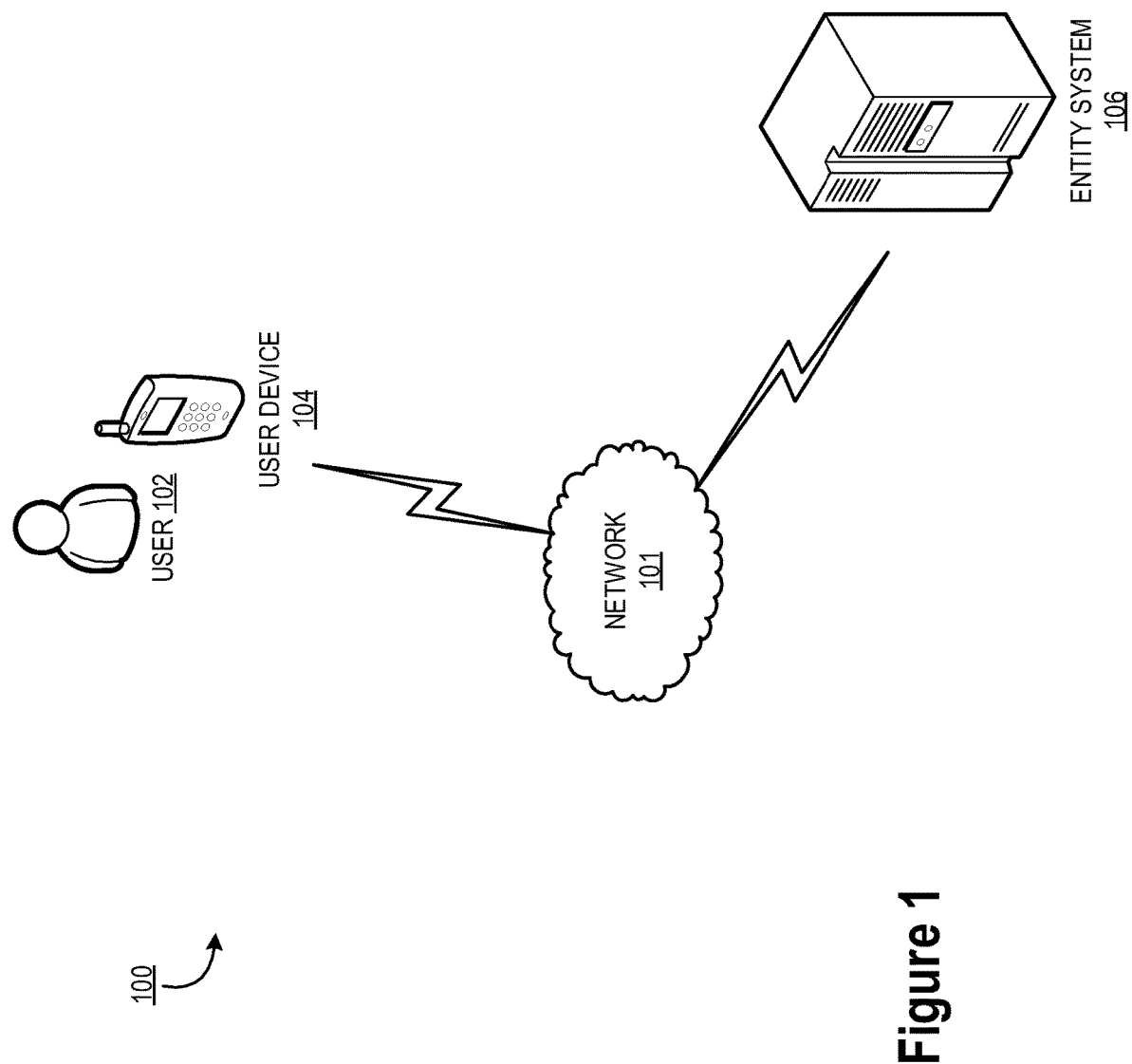
Figure 2:
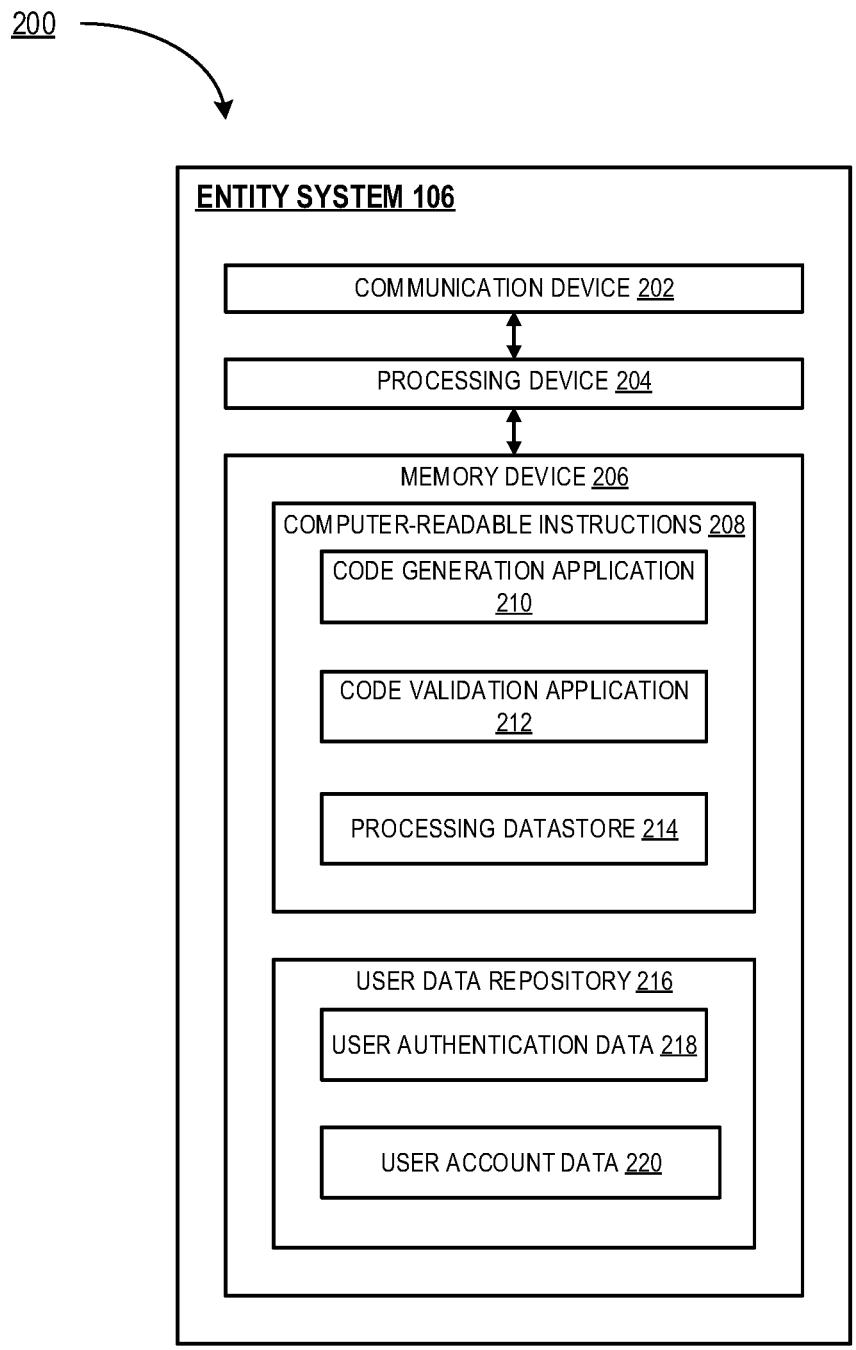
Figure 3:
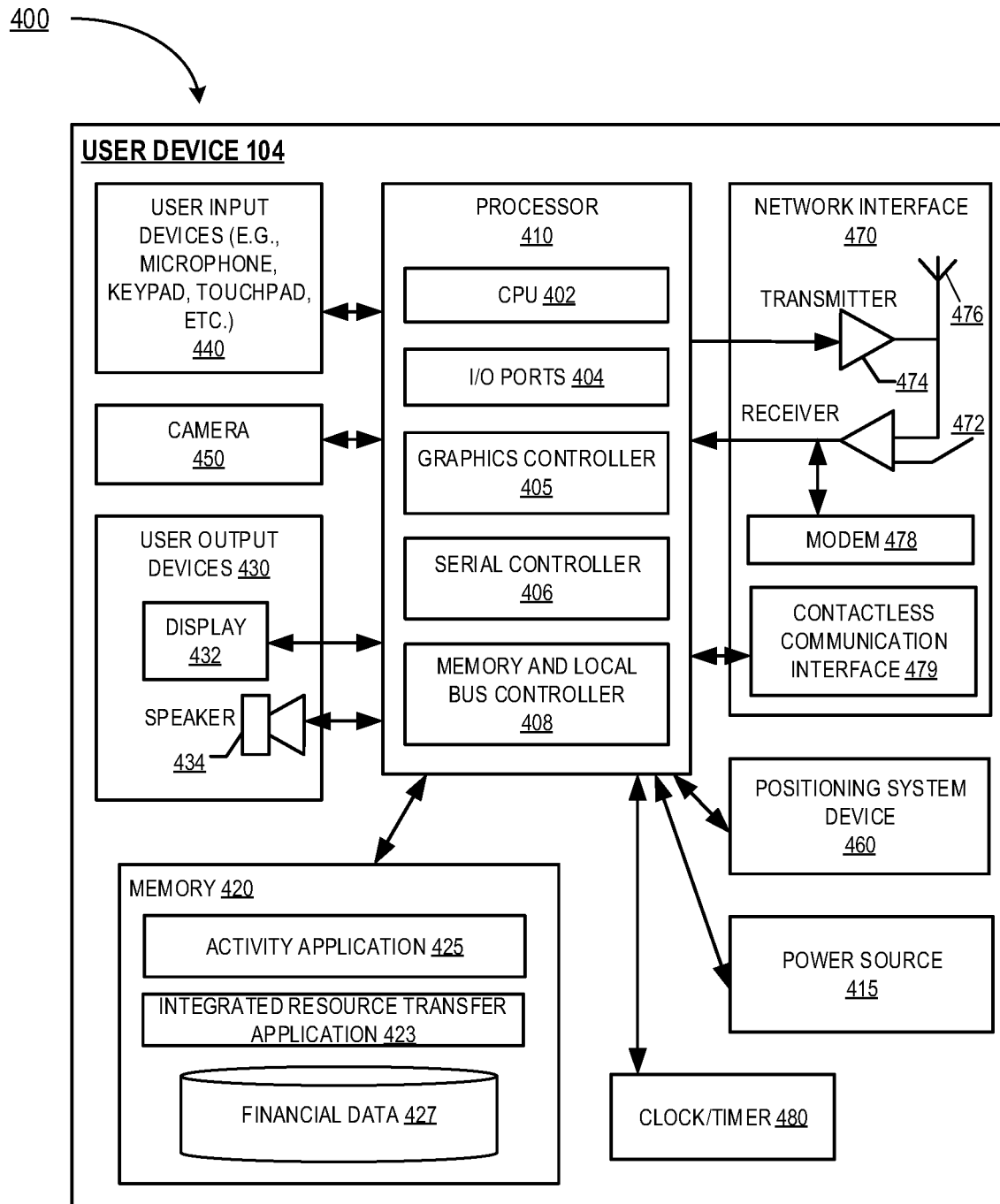
Figure 4:
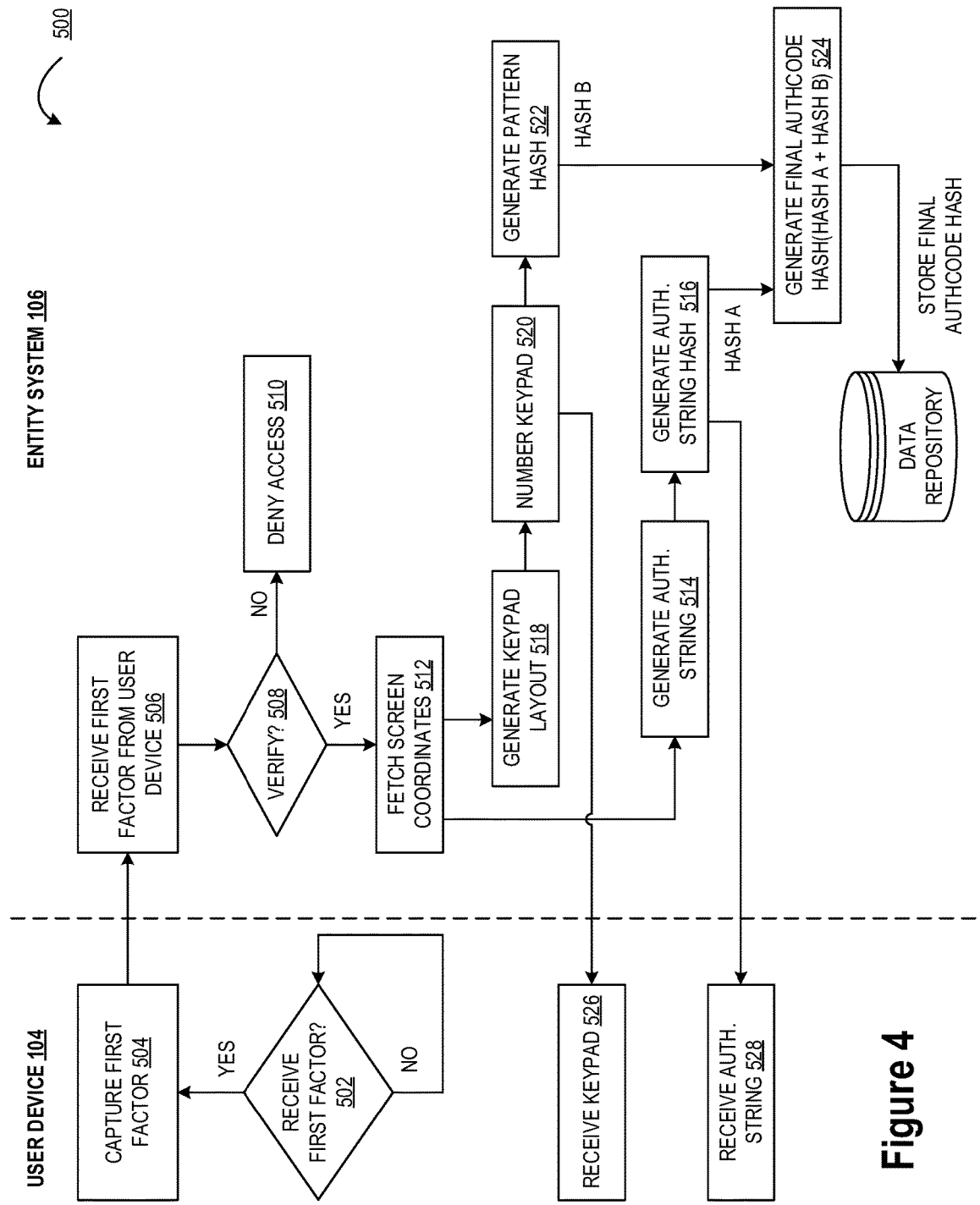
Figure 5:
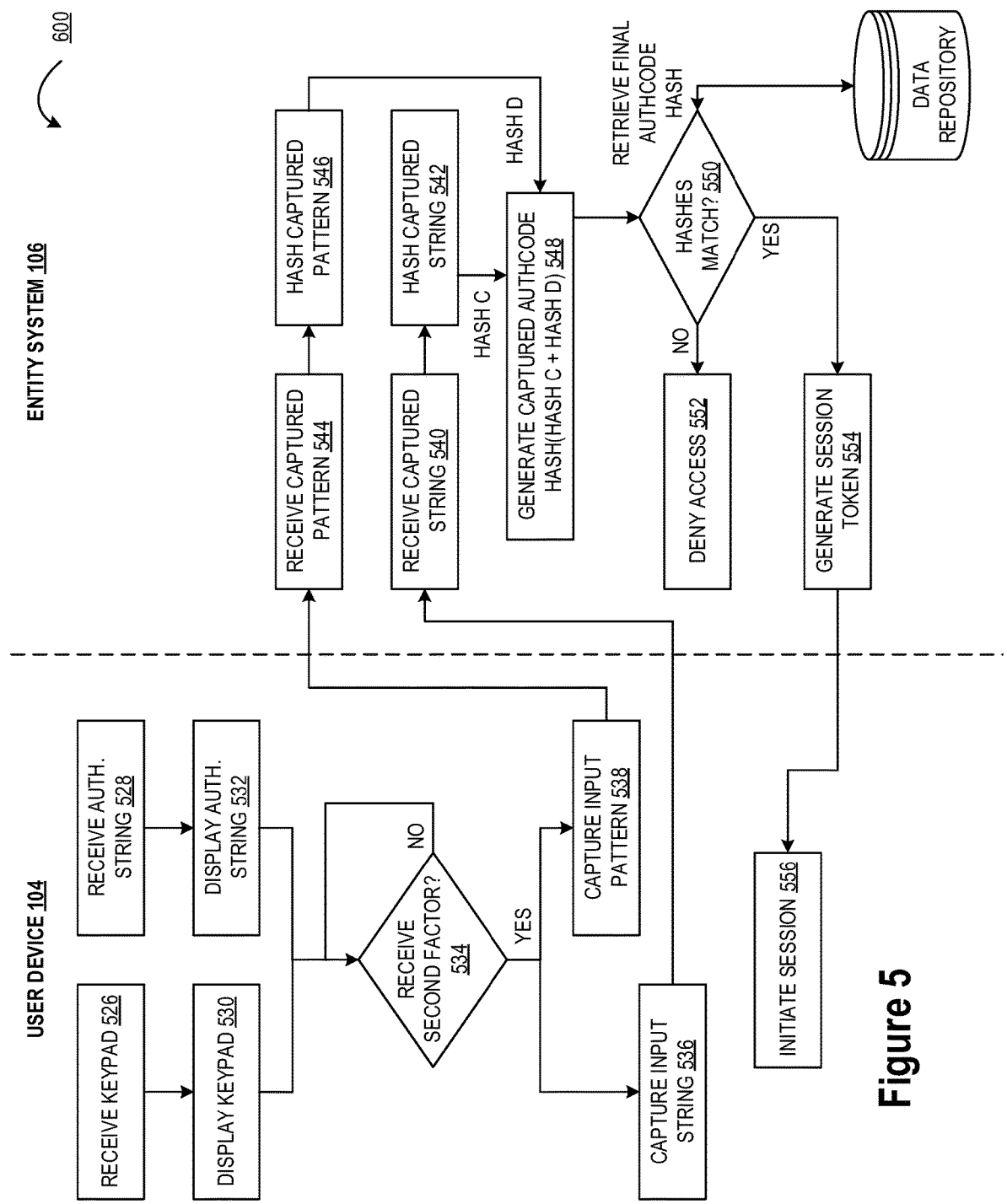
Figure 6:
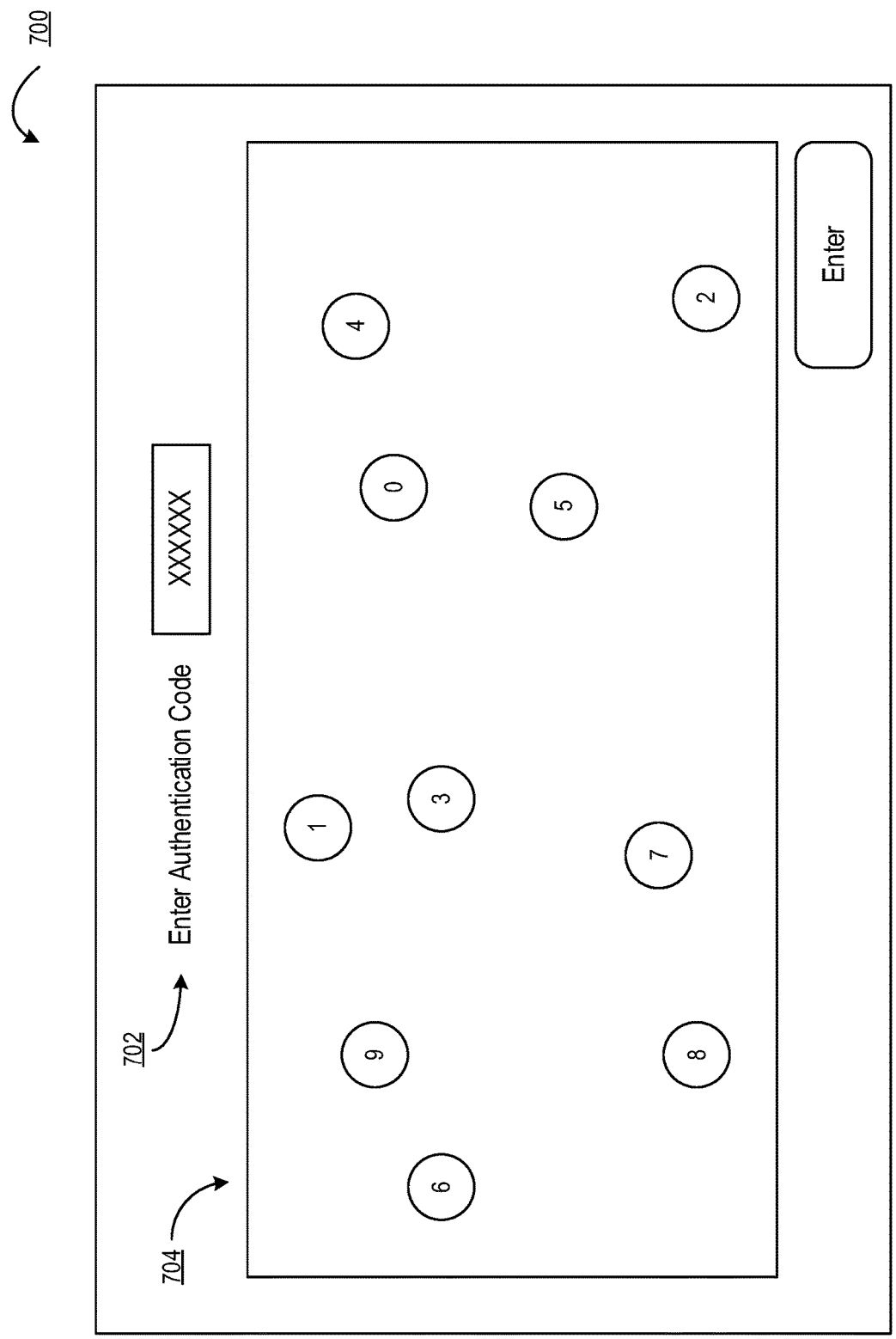
Figure 7:
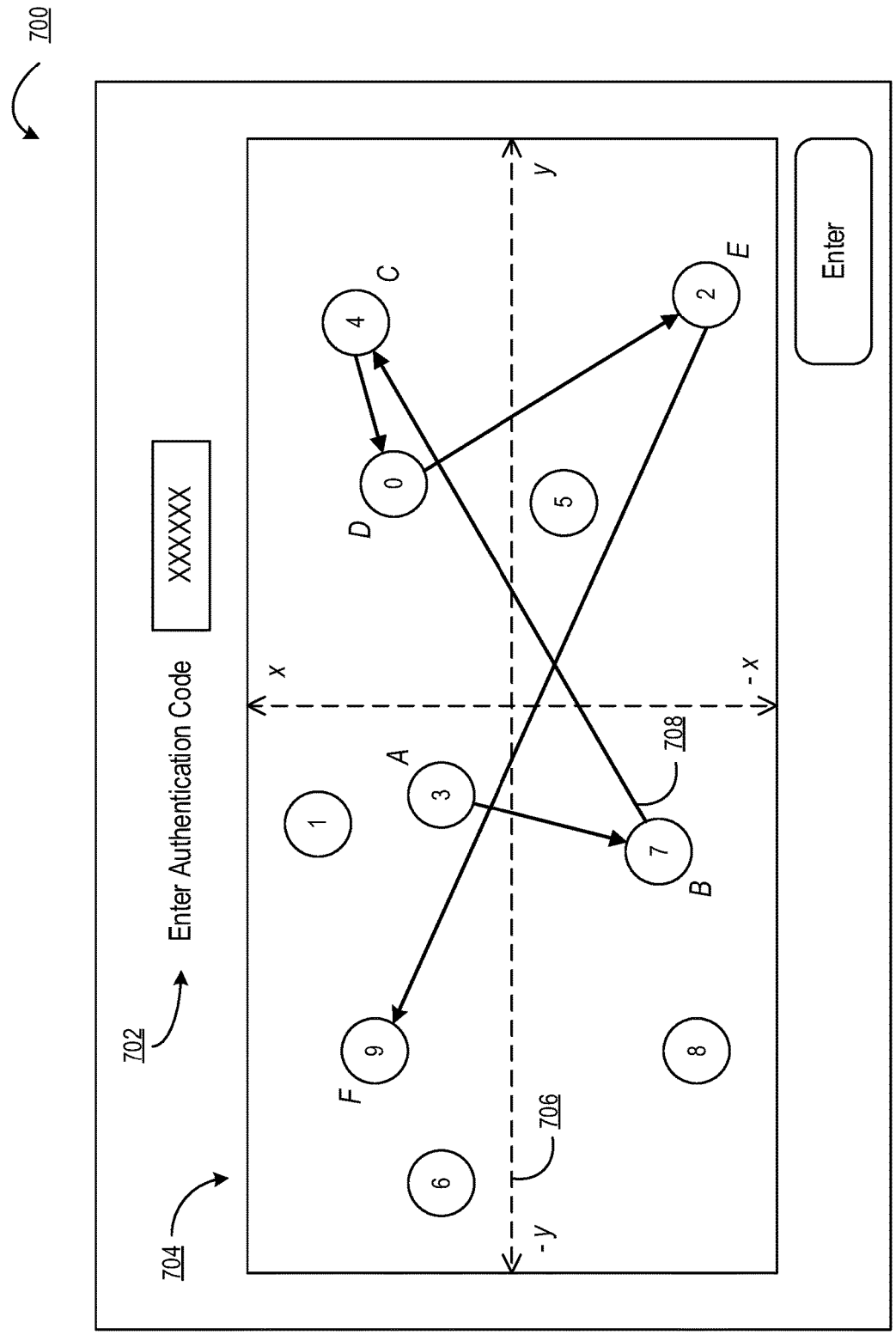
Figure 8:
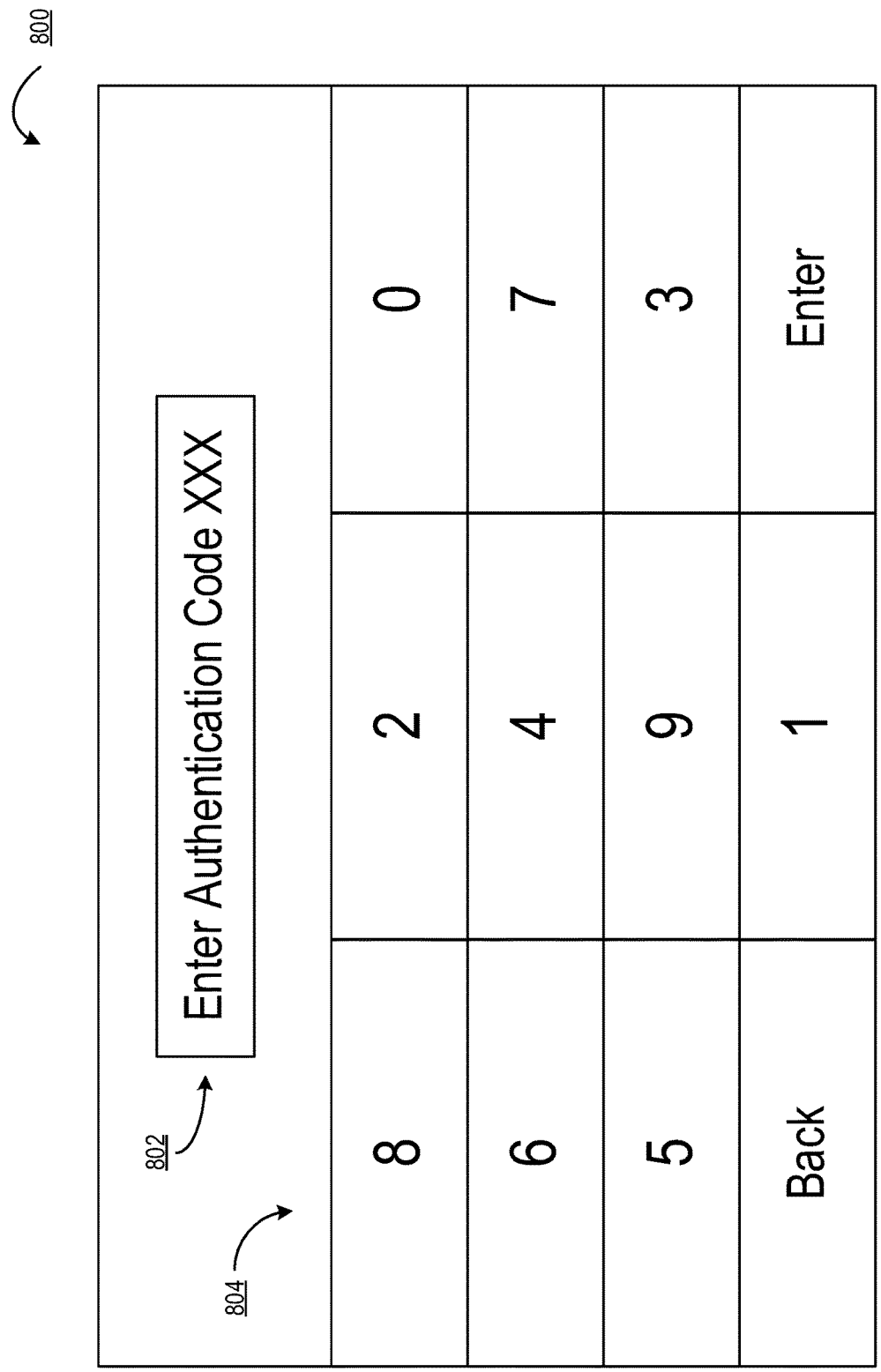
Figure 9:
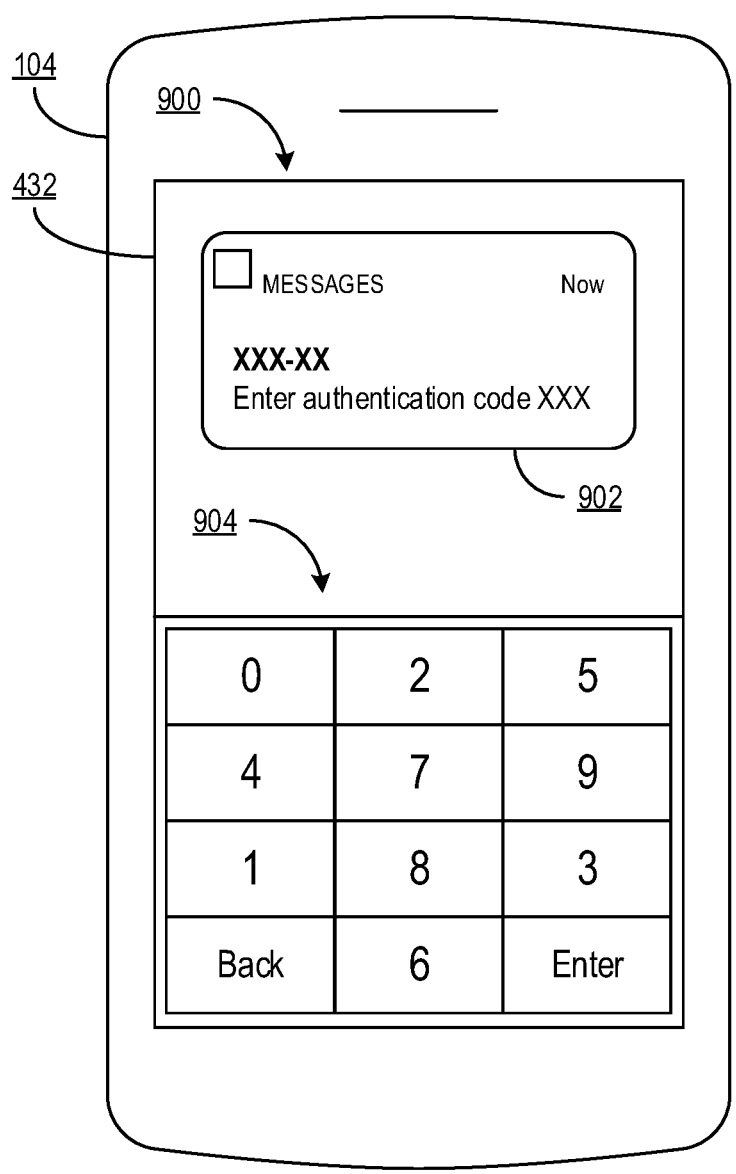
Figure 10:
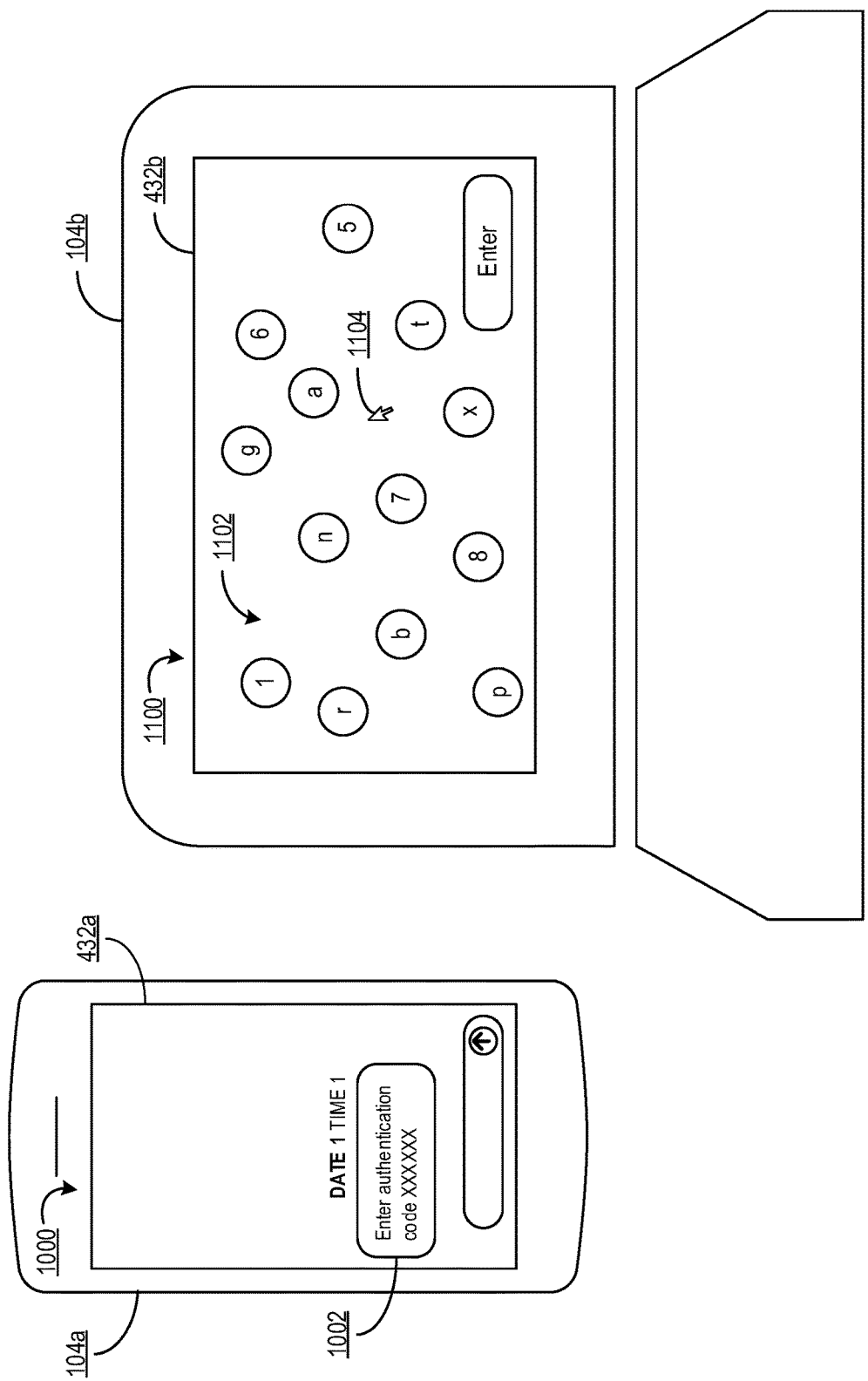
Figure 11:
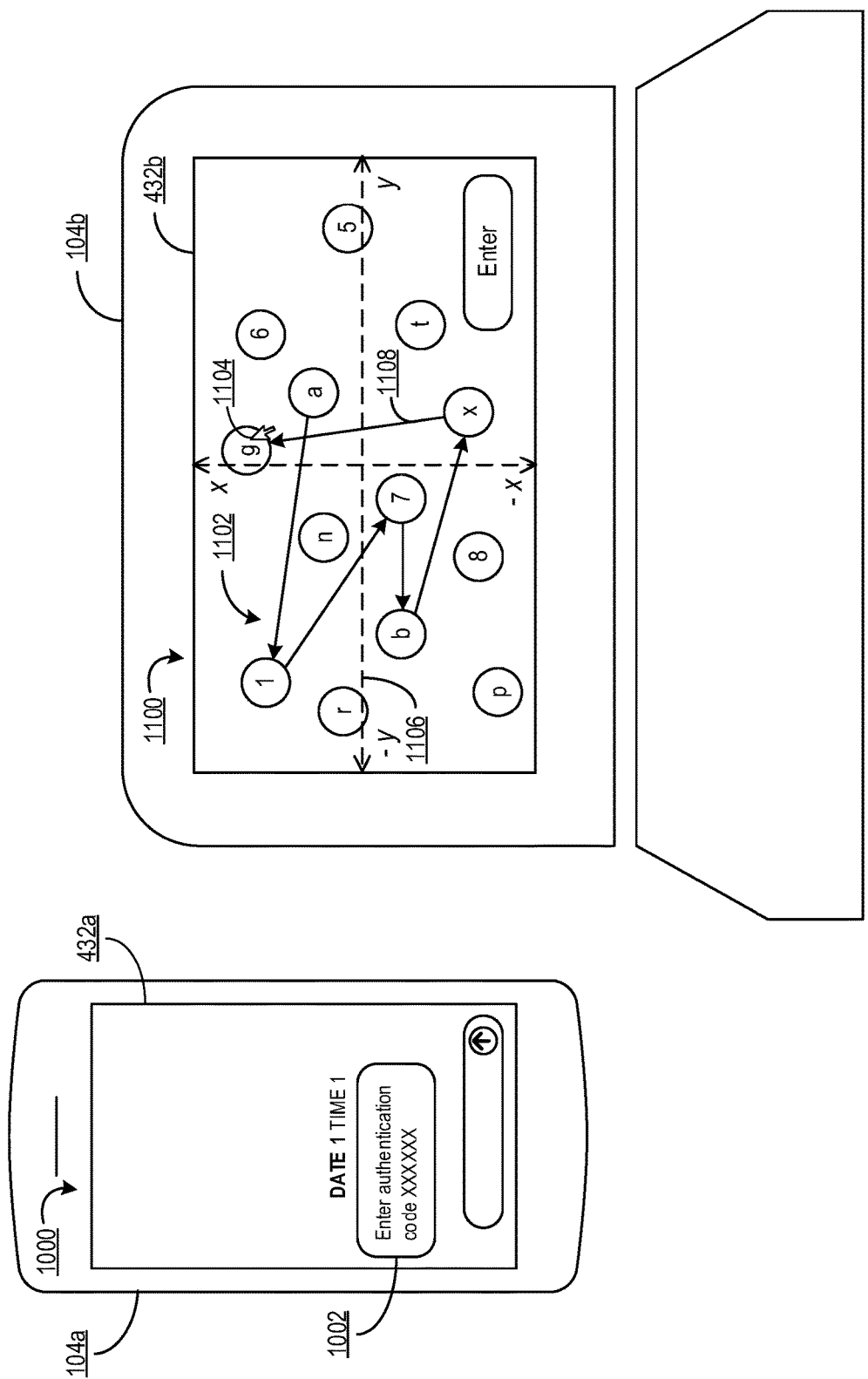

Having thus described embodiments of the invention in general terms, reference will now be made to the accompanying drawings, where:

FIG. 1 illustrates a block network architecture diagram illustrating a system environment 100 for generation and validation of secure authentication codes, in accordance with some embodiments of the invention;

FIG. 2 illustrates a block diagram 200 of an entity system, in accordance with some embodiments of the invention;

FIG. 3 illustrates a block diagram 400 of a user device, in accordance with some embodiments of the invention;

FIG. 4 illustrates a high-level process flow 500 for generation of secure authentication codes, in accordance with some embodiments of the invention;

FIG. 5 illustrates a high-level process flow 600 for validation of secure authentication codes, in accordance with some embodiments of the invention;

FIG. 6 illustrates a representation of a graphical user interface 700 for display on a user device, in accordance with some embodiments of the invention;

FIG. 7 illustrates a representation of the graphical user interface 700 of FIG. 6 being used to validate an authentication code, in accordance with some embodiments of the invention;

FIG. 8 illustrates another representation of a graphical user interface 800 for display on a user device, in accordance with some embodiments of the invention;

FIG. 9 illustrates another representation of a graphical user interface 900 for display on a user device, in accordance with some embodiments of the invention;

FIG. 10 illustrates a representation of a graphical user interface 1000 for display on a first user device and a graphical user interface 1100 for display on a second user device, in accordance with some embodiments of the invention; and FIG. 11 illustrates a representation of the graphical user interfaces 1000 and 1100 of FIG. 10 used to validate an authentication code, in accordance with some embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution or establishment that requires an authentication process to view information, such as sensitive or secure information, stored with the institution or establishment. As such, the entity may be any institution, group, association, financial institution, merchant, establishment, company, union, authority, or the like.

As described herein, a "user" is an individual associated with an entity. As such, in some embodiments, the user may be an individual having past relationships, current relationships, or potential future relationships with an entity. In some instances, a "user" is an individual who has a relationship with the entity, such as a customer or a prospective customer. For example, in the instances where the entity is a resource entity or a merchant, financial institution, or the like, a user may be an individual or entity with one or more relationships, affiliations, or accounts with the entity (e.g., the merchant, the financial institution). In some instances, the user is an individual who seeks to utilize, operate, or perform one or more activities associated with a user device based on successful validation of the user's authentication credentials. In some embodiments, a "user" may be an employee (e.g., a technology operator/technician, an associate, a project manager, an information technology (IT) specialist, a manager, an administrator, an internal operations analyst, or the like) of the entity or enterprises affiliated with the entity, capable of operating the systems described herein. In some instances, a user may be any individual or entity who has a relationship with a customer of the entity or financial institution. For purposes of this invention, the term "user" and "customer" may be used interchangeably.

A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, user information, or the like. The technology resource or account may be associated with and/or maintained by an entity, and may typically be associated with technology infrastructure such that the resource or account may be accessed, modified, or acted upon by the user electronically, for example, using transaction terminals, user devices, merchant systems, and the like. In some embodiments, the entity may provide one or more technology instruments or financial instruments to the user for executing resource transfer activities or financial transactions. In some embodiments, the technology instruments/financial instruments, like electronic tokens, credit cards, debit cards, checks, loyalty cards, entity user device applications, account identifiers, routing numbers, passcodes and the like, may be associated with one or more resources or accounts of the user. As discussed, in some embodiments, the entity may represent a vendor or a merchant with whom the user engages in financial transactions (e.g., resource transfers like purchases, payments, returns, enrolling in merchant accounts and the like) or non-financial transactions (for resource transfers associated with loyalty programs and the like), either online or in physical stores or merchant locations.

As used herein, a "user interface" may be a graphical user interface (GUI) that facilitates communication using one or more communication mediums, such as tactile communication (e.g., communication via a touchscreen, keyboard, and the like), audio communication, textual communication, and/or video communication (e.g., gestures detected by a camera). In various embodiments, a graphical user interface of the present invention may be a type of interface that allows users to interact with electronic elements/devices, such as graphical widgets, graphical icons, and visual indicators (e.g., secondary notation), as opposed to using only text via the command line. That said, the graphical user interfaces may be configured for audio, visual, and/or textual communication, and may be configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface may be configured to be presented on one or more display devices associated with user devices, entity systems, auxiliary user devices, processing systems, and the like.

An electronic activity, also referred to as a "technology activity" or a "user activity," such as a "resource transfer" or "transaction," may refer to any activities or communications between a user or entity and a financial institution, between the user and the entity, activities or communication between multiple entities, communication between technology applications, and the like. A resource transfer may refer to a payment, a processing of funds, a purchase of goods or services, a return of goods or services, a payment transaction, a credit transaction, or other interactions involving a user's resource or account. In the context of a financial institution or a resource entity such as a merchant, a resource transfer may refer to one or more of: a transfer of resources/funds between financial accounts (also referred to as "resources"), a deposit of resources/funds into a financial account or resource (e.g., depositing a check), a withdrawal of resources or funds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills and the like); loading money onto stored value cards (SVCs) and/or prepaid cards; donating to charities; and/or the like. Unless specifically limited by the context, a "resource transfer," a "transaction," a "transaction event," or a "point of transaction event" may refer to any user activity (financial or non-financial activity) initiated between a user and a resource entity (such as a merchant), between the user and a financial institution, or any combination thereof.

In accordance with embodiments of the invention, the term "electronic communication" may refer to a communication associated with a user, typically received, viewed, and/or transmitted via a communication channel. In some embodiments, electronic communications may be associated with user communications relating to user travel, user appointments, etc. (e.g., non-financial communications). In some embodiments, electronic communications may be associated with user communications relating to user financial statements (e.g., savings statements, shareholder notices, etc.), bill payments, account notifications, communications requiring actions to be performed by the user, communications triggering resource/account activities, documents to be signed by the user, etc. (e.g., financial communications). In some embodiments, communication channels may comprise cellular, audio, email, cellular messaging, website, mobile application notifications, and the like.

Under current systems and methods, an entity may store sensitive or secure information relating to a user. For example, a user may maintain one or more accounts and/or resources with the entity, and the entity may store sensitive information relating to the user (e.g., the user's birthday, the user's address, and the like), as well as sensitive information relating to the one or more accounts and/or resources (e.g., account names, account balances, resource transfer histories, and the like). As such, before the user can view the sensitive or secure information, the entity may require that the user complete an authentication process. To illustrate, in some instances, the entity may perform a two-factor authentication of the user based on two of the following: something the user knows (e.g., a username and password), something the user has (e.g., a personal user device, such as a cellphone), and something the user is (e.g., a biometric). As an example, for a user requesting access to sensitive or secure information, the entity may require the user to enter in a first set of authentication credentials based on something the user knows, such as a username and password. After verifying that the first set of authentication credentials is correct, the entity may transmit an authentication code (e.g., a one-time personal identification number (OTP)) to a personal user device associated with the user, such as a cellphone, and the user must correctly enter the authentication code as a second set of authentication credentials. The entity may then grant the user access if the code the user inputs matches the authentication code sent to the personal user device. Authentication codes may also be used in other scenarios where misappropriation can occur, such as when a user attempts to log in to a workplace computer or complete a resource transfer.

As such, authentication codes may be increasingly used in settings where a user must be authenticated, such as in settings where a user may want to check information regarding their accounts, resource transfer settings, workplace settings, and the like. However, in some cases, authentication codes may be compromised. In such cases, an unwanted third party may attempt to use compromised authentication codes to misappropriate access to secure or sensitive information. For example, authentication codes may be generated to fall within a certain range, leaving room for a third party to predict them. As another example, authentication codes may be susceptible to social engineering attacks such that they can be used. Further, in some cases, authentication codes may not be locked to a specific context such that authentication codes may be used in unwanted contexts.

Accordingly, embodiments of the present disclosure are directed to systems and methods for generation and validation of secure authentication codes. More specifically, in various embodiments described herein, a user may request access to sensitive information or resources stored with an entity, and in response, the entity may initiate an authentication process for the user. The authentication process may include generating an authentication code for the user, such as an OTP, as well as generating a unique and/or randomized graphical user interface that includes a keypad for entering the code. As an illustration, the unique and/or randomized GUI may include a keypad with alphanumeric characters randomly assigned to the keypad buttons or a keypad with the locations of buttons randomly assigned within an open area and with alphanumeric characters randomly assigned to the keypad buttons. Additionally, the GUI may be generated specific to the personal user device submitting the request for access. For example, the entity may fetch coordinates for a screen of the personal user device and generate the GUI, including the keypad, specific to those screen coordinates. Moreover, the entity may use distances between inputs by the user to the GUI as part of the authentication process, as described in further detail below. If the GUI is displayed on an incorrect device, the distances may be different, thereby alerting the entity to potential misappropriation.

The authentication code and the GUI are sent to one or more personal user devices associated with the user. For example, entity may transmit the authentication code to a cellphone associated with the user and transmit the GUI to a computing device, such as a laptop computer, desktop computer, or tablet computer, associated with the user and from which the user requested access to the sensitive information or resources. Alternatively, the entity may transmit both the authentication code and the GUI to the same personal user device, which may be the same personal user device from which the user requested access to the sensitive information or resources or a separate personal user device. The user must then correctly input the authentication code into the GUI in order to be authenticated. In some cases, for instance, the entity may generate a first hash based on the authentication code and a second hash based on a pattern of the authentication code as theoretically correctly entered into the GUI, and the entity may further generate a final authentication code hash from the first hash and the second hash. The entity may then store the final authentication code hash in a data repository. Additionally, the entity may generate a third hash based on the captured authentication code input by the user and a fourth hash based on how the captured authentication code was entered into the GUI by the user, and the entity may further generate a captured authentication code hash from the third hash and fourth hash. The entity may compare the stored final authentication code hash with the captured authentication code hash. If the two hashes match, the user is authenticated. Otherwise, the user may be denied access to the requested information or resources.

As such, the authentication codes described herein may be locked to a particular context and device, as the authentication codes must be entered into the GUI that is also generated by the entity. Moreover, the GUI may be generated specific to the personal user device on which it is displayed and use information from the personal user device, such as the distances between inputs by the user on the GUI, as part of the authentication process. In this way, it may be more difficult for a third party to misappropriate an authentication code and use the misappropriated code to gain access, for example, to one or more accounts and/or resources the user holds with the entity. As an illustration, if the authentication code is compromised, a third party in possession of the compromised authentication code cannot use the authentication code to gain access because the code must be entered into the GUI for successful authentication.

Referring to FIG. 1, a block diagram illustrating a system environment 100 configured for generation and validation of secure authentication codes is illustrated, in accordance with some embodiments of the invention. As illustrated, the system environment 100 includes one or more user devices 104 that are associated with a user 102. The system environment 100 also includes an entity system 106 in operative communication with the one or more user devices 104. As such, the one or more user devices 104 are configured to receive data, such as authentication codes and authentication graphical user interfaces, from the entity system 106.

Typically, the one or more user devices 104 are in electronic communication with the entity system 106, via the network 101, which may be the internet, an intranet, or the like. The network 101 is configured to establish an operative connection between otherwise incompatible devices, for example, by establishing a communication channel, automatically and in real time, between the one or more user devices 104 and the entity system 106. In this regard, the wireless communication channel may further comprise near field communication (NFC), communication via radio waves, communication through the internet, communication via electromagnetic waves, and the like. In FIG. 1, the network 101 may include a local area network (LAN), a wide area network (WAN), a global area network (GAN), and/or a near field communication (NFC) network. Accordingly, the network 101 may provide for wireline, wireless, or a combination of wireline and wireless communication between devices in the network 101.

The entity system 106 is associated with the entity and configured to store information relating to the relationship the user 102 has with the entity. For example, if the user 102 has a relationship with the entity based on an account or an amount of resources the user 102 maintains with the entity, the entity system 106 may store information about the user 102 and information about the account or resources. Additionally, the entity system 106 is configured to receive a request from the user 102 via the user device 104 for access to, for example, sensitive or secure information relating to the user 102 and, in response, authenticate the user. As part of the authentication process, the entity system 106 may further communicate with the user device 104 with respect to how information is displayed to the user 102 on the user device 104, for example by transmitting all or part of graphical user interfaces that are displayed to the user 102. These graphical user interfaces may be configured for inputting an authentication code also sent to a user device 104 as described in further detail below. The components of the entity system 106, its features, and its functions will be described in further detail below and with respect to FIG. 2, in particular.

A user device 104 may comprise a mobile communication device, such as a cellular telecommunications device (e.g., a smartphone or mobile phone), a computing device such as a laptop computer or a desktop computer, a personal digital assistant (PDA), a mobile internet accessing device, or other mobile device including, but not limited to, pagers, mobile televisions, gaming devices, cameras, video recorders, audio/video players, radios, global positioning system (GPS) devices, any combination of the aforementioned, or the like. The user device 104 is configured to connect to the network 101, as well as receive and transmit information over the network 101. As an illustration, the user device 104 may receive information from the entity system 106, such as authentication codes and graphical user interfaces, and transmit information, such as codes and other authentication information captured from the user's inputs into the user device 104, as part of a process for generating and validating secure authentication codes. The components of the user device 104, its features, and its functions will be described in further detail below and with respect to FIG. 3, in particular.

Additionally, it should be understood that while the user device 104 is illustrated in FIG. 1 as a single user device, in some embodiments, the system environment 100 may include multiple user devices 104. These multiple user devices 104 may be of the same type or of different types. For example, in some embodiments, the system environment 100 may include a first user device 104 embodied as a smartphone and a second user device 104 embodied as a laptop, desktop, or tablet computer.

FIG. 2 illustrates a block diagram 200 of the entity system 106, in accordance with some embodiments of the invention. As illustrated in FIG. 2, the entity system 106 may include a communication device 202; a processing device 204; and a memory device 206 having a code generation application 210, a code validation application 212, and a processing datastore 214 stored therein. As shown, the processing device 204 is operatively connected to and configured to control and cause the communication device 202 and the memory device 206 to perform one or more functions. In some embodiments, the code generation application 210 and/or code validation application 212 comprises computer-readable instructions or computer-readable code that when executed by the processing device 204 cause the processing device 204 to perform one or more functions. For example, the code generation application 210 and/or code validation application 212 may include a computer-readable program code having one or more executable portions. It will be understood that the code generation application 210 and/or the code validation application 212 may be executable to initiate, perform, complete, and/or facilitate one or more portions of any embodiments described and/or contemplated herein.

The communication device 202 may generally include a modem, server, transceiver, and/or other device for communicating with other devices on the network 101. In some embodiments, the communication device 202 may be a communication interface having one or more communication devices configured to communicate with one or more devices on the network 101, such as the user device 104. The communicative connection to one or more devices on the network 101 may be via a wired or wireless connection. In this regard, the wireless communication channel may comprise near field communication (NFC), communication via radio waves, communication through the internet, communication via electromagnetic waves, communication via applicable cellular systems of wireless telephone networks, and the like.

Additionally, referring to the entity system 106 illustrated in FIG. 2, the processing device 204 may generally refer to a device or combination of devices having circuitry used for implementing the communication and/or logic functions of the processing device 204. For example, the processing device 204 may include a control unit; a digital signal processor device; a microprocessor device; and various analog-to-digital converters, digital-to-analog converters, and other support circuits and/or combinations of the foregoing. Control and signal processing of the entity system 106 may be allocated between these processing devices according to their respective capabilities. The processing device 204 may further include functionality to operate one or more software programs based on computer-readable instructions 208 thereof, which may be stored in the memory device 206, such as the code generation application 210 and the code validation application 212.

As the phrase is used herein, a processing device may be "configured to" perform a certain function in a variety of ways, including, for example, by having one or more general-purpose circuits perform the function by executing particular computer-executable program code embodied in a computer-readable medium and/or by having one or more application-specific circuits perform the function. The processing device 204 may be configured to use the network communication interface of the communication device 202 to transmit and/or receive data and/or commands to and/or from the other devices/systems connected to the network 101.

The memory device 206 within the entity system 106 may generally refer to a device or combination of devices that store one or more forms of computer-readable media for storing data and/or computer-executable program code/instructions. For example, the memory device 206 may include any computer memory that provides an actual or virtual space to temporarily or permanently store data and/or commands provided to the processing device 204 when it carries out the functions described herein.

The entity system 106 may further include a user data repository 216 comprising user authentication data 218 and user account data 220. The processing device 204 may utilize the user authentication data 218 to validate user authentication credentials, as described in further detail below. The account data 220 may reflect the current account data of the user 102 and may include information about one or more accounts of the user 102 that the user is requesting to access (e.g., names of one or more accounts that the user 102 holds with the entity, balances in one or more accounts that the user 102 holds with the entity, and the like). Alternatively, in some embodiments, the entity system 106 may store different data that the user 102 is requesting to access, such as data for a workplace of the user 102.

In some embodiments, the code generation application 210 may comprise computer-readable instructions associated with one or more authentication steps, or the computer-readable instructions associated with the one or more authentication steps may be stored in the processing datastore 214. The code generation application 210 may be embodied within the code validation application 212, in some instances, or the code validation application 212 may be embodied in the code generation application 210, in some instances. In some embodiments, the code generation application 210 comprises computer-readable instructions that, when executed by the processing device 204, cause the processing device 204 to perform one or more functions and/or transmit control instructions to other components or devices to perform one or more code generation steps described herein.

These code generation steps may include requesting a first authentication credential from the user 102 via the user device 104. For example, the user 102 may send a request to the entity system 106 from the user device to access a website or secure portion of an application, for example, relating to resources and/or an account held by the user 102 with the entity. In response, the code generation application 210 may request a first set of authentication credentials from the user 102 (e.g., a username, a password, a biometric, and/or the like). Based on the first set of authentication credentials input by the user 102 and received from the user device 104, the code generation application 210 may perform a first-factor authentication of the user 102, such as by comparing the first set of authentication credentials to template credentials stored for the user 102 in the user authentication data 218 of the user data repository 216. If the received authentication credentials match the template credentials, the code generation application 210 may move on to a second-factor authentication of the user 102. Otherwise, if the received authentication credentials do not match the template credentials, the code generation application 210 may deny access to the user 102. For example, the entity system 106 may transmit a GUI to the user device 104 indicating that the user 102 needs to retry entering their credentials.

As indicated above, if the first set of authentication credentials matches the template credentials, the code generation application 210 may proceed to a second-factor authentication of the user 102. Accordingly, the code generation application 210 may generate an authentication code for the user 102. In some embodiments, the authentication code may be a string of alphanumeric characters, such as a random number having N number of digits or a string of N length randomly mixing numbers with letters. The code generation application 210 may also fetch screen coordinates, such as display screen specifications, for the user device 104 (e.g., the user device 104 submitting the request for access or a separate user device 104 known to be associated with the user 102) and generate a graphical user interface (GUI) that corresponds to the authentication code. As such, the code generation application 210 may generate a dynamic on-screen layout including a keypad or other selectable widget with randomly assigned numbers or other alphanumeric characters. For example, the code generation application 210 may generate a GUI including a keypad layout and randomly number the keypad with at least the characters in the authentication code (e.g., the code generation application 210 may number the keypad with just the characters in the authentication code or with additional characters not in the authentication code). Additionally, the GUI may be generated based on the screen coordinates fetched for the user device 104 such that the GUI is tailored to be displayed on the user device 104.

The code generation application 210 may then generate a final authentication code hash (e.g., based on a hash of the authentication code and/or a hash of the pattern of the authentication code as theoretically entered into the authentication GUI) and store the final authentication code hash, for example, in the user authentication data 218 of the user data repository 216. Finally, the code generation application 210 may transmit the authentication code and the authentication GUI to the one or more user devices 104. For instance, in some embodiments, the code generation application 210 may transmit the authentication code to a first user device 104 and transmit the authentication GUI to a second user device 104. Alternatively, in other embodiments, the code generation application 210 may transmit the authentication code and the authentication GUI to the same user device 104.

In some embodiments, the code validation application 212 may comprise computer-readable instructions associated with one or more authentication steps, or the computer-readable instructions associated with one or more authentication steps may be stored in the processing datastore 214. The code validation application 212 may be embodied within the code generation application 210, in some instances, or the code generation application 210 may be embodied within the code validation application 212, in some instances. In some embodiments, the code validation application 212 comprises computer-readable instructions that, when executed by the processing device 204, cause the processing device 204 to perform one or more functions and/or transmit control instructions to other components or devices to perform one or more code validation steps described herein.

These code validation steps may include receiving a captured code and a captured pattern from one or more user devices 104. For example, the captured code may be a string of alphanumeric characters input by the user 102 into the user device 104 via the authentication GUI displayed on the user device 104. Similarly, the captured pattern may be a pattern of the captured code as input into the authentication GUI. Alternatively, in some embodiments, each of the captured code and captured pattern may be received by the entity system 106 as a hash. After receiving the captured code and the captured pattern, the code validation application 212 may generate a captured authentication code hash (e.g., based on a hash of the captured code and/or a hash of the captured pattern). The code validation application 212 may compare the final authentication code hash and the captured authentication code hash. If the hashes match, then the code validation application 212 may determine that the second-factor authentication has been successful and provide a session token to the user device 104 such that the user can access, for example, the website or secure portion of the application. Otherwise, if the hashes do not match, the code validation application 212 may deny access to the user 102. This process is described in further detail below, in particular with reference to FIGS. 4 and 5.

It should be understood that while in FIG. 2, the block diagram 200 of the entity system 106 includes all of the code generation application 210, code validation application 212, processing datastore 214, user authentication data 218, and user account data 220, in some embodiments, one or more of these applications, datastore, or data may be embodied in a separate system. For example, in some embodiments, the entity system 106 may include the user account data 220, and a separate, second system may include the code generation application 210, code validation application 212, processing datastore 214, and user authentication data 218. The second system may electronically communicate with both the entity system 106 and the one or more user devices 104 as described herein to authenticate the user 102 such that the user 102 can, for example, access the user account data 220 stored in the user data repository 216 of the entity system 106.

FIG. 3 illustrates a block diagram 400 of a user device 104, such as a smartphone or laptop computer, in accordance with some embodiments of the invention. A user device 104 may generally include a processing device or processor 410 communicably coupled to devices of the user device 104, such as a memory device 420; user output devices 430 (e.g., a user display device 432 and/or a speaker 434); user input devices 440 (e.g., a microphone, keypad, touchpad, touch screen, and the like); a communication device or network interface device 470; a power source 415; a clock or other timer 480; a visual capture device, such as a camera 450; a positioning system device 460, such as a geo-positioning system device (e.g., a GPS device, an accelerometer, and the like); one or more chips; and the like. The processor 410 may further include a central processing unit (CPU) 402, input/output (I/O) port controllers 404, a graphics controller 405, a serial bus controller 406, and a memory and local bus controller 408.

The processor 410 may include functionality to operate one or more software programs or applications, which may be stored in the memory device 420. For example, the processor 410 may be capable of operating applications such as an activity application 425, an integrated resource transfer application 423, or a web browser application. The activity application 425, for example, may then allow the user device 104 to transmit and receive data and instructions from the entity system 106 (e.g., via wireless communication); web content, such as, for example, location-based content and/or other web page content, according to a Wireless Application Protocol (WAP), Hypertext Transfer Protocol (HTTP); and/or the like.

In various embodiments, the activity application 425 allows the user device 104 to receive data from the entity system 106. The data may include authentication codes and authentication GUIs, as described above with reference to FIG. 2. The activity application 425 may then display a received authentication code and/or a received authentication GUI to the user 102. In some embodiments, a single user device 104 may receive and display both the authentication code and the authentication GUI to the user 102. In other embodiments, a first user device 104 may receive and display the authentication code to the user 102, and a second user device 104 may receive and display the authentication GUI to the user 102.

The activity application 425 is also configured to capture a code (e.g., a string of alphanumeric characters) input by the user 102 into the authentication GUI, as well as a pattern of the code input into the authentication GUI, as described in further detail below. Additionally, the activity application 425 is configured to transmit both the captured code and the captured pattern to the entity system 106. In some embodiments, the activity application 425 may also hash the captured code and hash the captured pattern and transmit the hashes to the entity system 106. This process is described in further detail below, in particular with reference to FIGS. 4 and 5.

The integrated resource transfer application 423 and the financial data module 427, together, may include the necessary circuitry to provide token storage and transmission functionality and transmitter device signal encoding and decoding functionality to the user device 104, for example, for secure transmission of financial and authentication credential tokens via the contactless communication interface 479 to the entity system 106. That said, in some embodiments, the integrated resource transfer application 423 is pre-installed on the user device 104, while in other embodiments, the entity system 106 may transmit and cause installation of the application 423 based on determining that the user device 104 does not comprise the application 423 (e.g., in response to a request by the user 102 on the user device 104).

The processor 410 may be configured to use the network interface 470 to communicate with one or more devices on the network 101, such as, but not limited to the entity system 106 (e.g., via the network 101). In this regard, the network interface device 470 may include an antenna 476 operatively coupled to a transmitter 474 and a receiver 472 (together a "transceiver"), a modem 478, and a contactless communication interface 479. The processor 410 may be configured to provide signals to and receive signals from the transmitter 474 and receiver 472, respectively. The signals may include signaling information in accordance with the air interface standard of the applicable Bluetooth® Low Energy (BLE) standard, cellular system of the wireless telephone network, and the like, that may be part of the network 101. In this regard, the user device 104 may be configured to operate with one or more air interface standards, communication protocols, modulation types, and access types.

By way of illustration, the user device 104 may be configured to operate in accordance with any of a number of first, second, third, fourth, and/or fifth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)); with third-generation (3G) wireless communication protocols, such as Universal Mobile Telecommunications System (UMTS), CDMA2000, wideband CDMA (WCDMA) and/or time division-synchronous CDMA (TD-SCDMA); with fourth-generation (4G) wireless communication protocols; with fifth-generation (5G) wireless communication protocols; and/or the like. The network interface 470 of the user device 104 may also be configured to operate in accordance with non-cellular communication mechanisms, such as via a wireless local area network (WLAN) or other communication/data networks.

The network interface device 470 or communication device 470 may also include a user interface presented by one or more user output devices 430 in order to allow a user 102 to execute some or all of processes described herein. The application interface may have access to the hardware (e.g., the transceiver) and software previously described with respect to the network interface device 470. Furthermore, the user interface may have the ability to connect to and communicate with an external data storage on a separate system within the network 101.

As described above, the user device 104 may include user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440 may include any of a number of devices allowing the user device 104 to receive data from a user 102, such as a keypad, keyboard, touchscreen, touchpad, microphone, mouse, joystick, other pointer device, button, soft key, and/or other input device(s).

The user device 104 may further include a power source 415. Generally, the power source 415 may be a device that supplies electrical energy to an electrical load. In some embodiments, the power source 415 may convert a form of energy such as solar energy, chemical energy, mechanical energy, and the like, to electrical energy. Additionally, the power source 415 in the user device 104 may be a battery, such as a lithium battery, a nickel-metal hydride battery, or the like, that is used for powering various circuits, for example, the transceiver circuit and other devices that are used to operate the user device 104. Alternatively, the power source 415 may be a power adapter that can connect a power supply from a power outlet to the user device 104. In such embodiments, a power adapter may be classified as a power source "in" the user device 104.

The user device 104 may also include a memory buffer, cache memory, or temporary memory device operatively coupled to the processor 410. Typically, one or more applications (e.g., applications 425 and 423) are loaded into the temporary memory during use. As used herein, memory may include any computer-readable medium configured to store data, code, or other information. For example, the memory may store computer-readable program code including one or more executable portions. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

These features will now be described with respect to the process flow 500 of FIG. 4 and process flow 600 of FIG. 5. With respect to FIG. 4, the process flow 500 is shown from the perspective of one or more personal devices associated with a user (e.g., the one or more user devices 104 associated with the user 102) and from the perspective of a system associated with an entity (e.g., the entity system 106). As indicated by block 502, in some instances, a user device 104 determines whether a first authentication factor has been received from the user 102. For example, the user device 104 may determine whether a user has input a username and password into an application associated with the entity or a website associated with the entity, where the username and password represent a first set of authentication credentials in a two-factor authentication process. If not, the user device 104 continues to monitor for the first authentication factor. Otherwise, if the user has input a first authentication factor, the user device captures the first authentication factor, as indicated by block 504. The user device 104 transmits the first authentication factor to the entity system 106, which receives the captured first factor from the user device 104, as indicated by block 506.

As indicated by block 508, the entity system 106 verifies whether the captured first factor is accurate. In some embodiments, the entity system 106 may determine whether the captured first factor matches template authentication credentials stored in the user authentication data 218 of the user data repository 216. If the entity system 106 cannot verify the captured first factor, the entity system 106 denies the user 102 access, as indicated by block 510. For example, the entity system 106 may deny the user 102 access to the requested application, website, or the like. On the other hand, if the entity system 106 successfully verifies that the captured first factor is correct, the entity system 106 fetches screen coordinates for the requesting user device 104, as indicated by block 512.

Fetching screen coordinates may include, for instance, determining the type of user device 104 that requested access to the application, website, or the like such that the entity system 106 can determine the specifications of the display 432 of the user device 104. For example, when the user device 104 submits the captured first factor as an input into a website, application, etc., the transmittal of the captured first factor may include a field describing the manufacturer and model of the user device 104. The entity system 106 may then identify specifications for the user device 104 based on the manufacturer/model, such as by searching device specifications stored in the processing datastore 214, and specifically identify the specifications for the display device 432 (e.g., the dimensions, the pixels per inch (PPI), and so on for the screen of the display device 432). As another example, once the entity system 106 is in electronic communication with the user device 104, the entity system 106 may run a script that determines the dimensions of the screen of the display device 432.

After fetching the screen coordinates, the entity system 106 generates an authentication string, as indicated by block 514. In some embodiments, the entity system 106 may generate a string of random alphanumeric characters of N length, such as a random number having N digits. As indicated by block 516, the entity system 106 then generates an authentication string hash (e.g., in the example of FIG. 4, "Hash A"). In various embodiments, the entity system 106 may generate the authentication string hash by inputting the authentication string into an encryption algorithm to produce the authentication string hash. If the authentication string includes letters, the entity system 106 may convert the letters to numbers before inputting the authentication string into the encryption algorithm.

As indicated by block 518, the entity system 106 also generates a keypad layout. In some embodiments, the entity system 106 may generate the keypad layout from a stored keypad template. For example, the entity system 106 may store a general keypad template that the entity system 106 uses for the keypad layout. As another example, the entity system may store a number of keypad templates and randomly select one of the keypad templates to use as the keypad layout. As another example, the entity system 106 may generate the keypad layout by modifying a keypad template. For instance, the entity system 106 may retrieve a keypad template that includes general formatting for the keypad and then modify the keypad template, such as by randomly placing buttons on the keypad template that will be assigned alphanumeric characters. Additionally, in some embodiments, the entity system 106 may customize the keypad layout according to the fetched screen coordinates for the display 432 of the user device 104. This may include, for example, sizing the keypad layout for the display 432, measuring distances in the keypad layout with reference to the display 432, and so on. Further, by customizing the keypad layout according to the display 432, the entity system 106 may help ensure that only the user device 104 that submitted the access request, or another user device 104 associated with the user 102 and used in the authentication process, can be used to submit the authentication string.

As indicated by block 520, the entity system 106 then numbers the keypad to produce an authentication GUI. In some embodiments, the entity system 106 may randomly assign the alphanumeric characters of the authentication string to buttons or other graphical widgets that the user 102 can press on the keypad. In some embodiments, the entity system 106 may also randomly assign additional alphanumeric characters that are not part of the authentication string to buttons or other graphical widgets that the user 102 can press on the keypad. In this way, the entity system 106 may generate a dynamic layout/keypad with random characters for the authentication process.

As indicated by block 522, the entity system 106 generates a pattern hash (e.g., in the example of FIG. 4, "Hash B") based on the authentication GUI, which includes the numbered keypad, and the authentication string. In some embodiments, the entity system 106 determines the distance on the authentication GUI between each two consecutive characters making up the authentication string when the authentication string is theoretically entered into the authentication GUI. For example, if the authentication string is a string of five digits, the entity system 106 determines the distance on the authentication GUI between the first and second digits on the interface (e.g., "distance a"), between the second and third digits on the interface (e.g., "distance b"), between the third and fourth digits on the interface (e.g., "distance c"), and the distance between the fourth and fifth digits on the interface (e.g., "distance d"). In some instances, the entity system 106 may measure the distance between the consecutive characters in pixels, in United States customary units, in metric units, in display screen percentage, or the like. In some instances, the entity system 106 may use the absolute distances between the characters, while in other instances, the entity system 106 may normalize the distances between the characters (e.g., to compensate for the dimensions or size of the display screen of the user device 104). As an illustration, the entity system 106 may divide the distance between two consecutive characters as measured in pixels by the dimensions of the display device 432 of the user device 104 as measured in pixels (e.g., by the number of pixels making up the diagonal of the display device 432).

After measuring the distance between each two consecutive characters making up the authentication string on the authentication interface, in some embodiments, the entity system 106 may then sum the distances and generate a hash of the total summed distance. To illustrate, referring to the previous example, the entity system 106 may sum distance a, distance b, distance c, and distance d to produce a total distance and generate the hash by inputting the total distance into an encryption algorithm to produce the pattern hash. Alternatively, in other embodiments, the entity system 106 may generate a hash of each of the distances and further generate the pattern hash from all of the distance hashes, such as by inputting the sum of all of the distance hashes into an encryption algorithm. As an illustration, referring again to the previous example, the entity system 106 may hash distance a to produce "hash a," hash distance b to produce "hash b," hash distance c to produce "hash c," and hash distance d to produce "hash d." The entity system 106 may then sum hash a, hash b, hash c, and hash d to produce a total hash and generate the pattern hash by inputting the total hash into an encryption algorithm.

As indicated by block 524, the entity system 106 generates a final authentication code hash from the authentication string hash and the pattern hash (e.g., in the example of FIG. 4, "Hash A" and "Hash B"). For example, the entity system 106 may sum Hash A and Hash B and input the sum into an encryption algorithm (e.g., "AuthCode Hash" algorithm) to produce the final authentication code hash. As another example, the entity system 106 may generate the final authentication code hash simply by summing Hash A and Hash B. As shown in FIG. 4, the entity system 106 further stores the final authentication code hash in a data repository, such as in the user authentication data 218 of the user data repository 216.

As indicated by block 526, the entity system 106 transmits the authentication GUI including the numbered keypad to a user device 104, which receives the authentication GUI. As indicated by block 528, the entity system 106 also transmits the authentication string to a user device 104, which receives the authentication string. In some embodiments, the entity system 106 may transmit the keypad and the authentication string to the same user device 104 (e.g., the user device 104 that requested access to the application, website, or the like), such as a smartphone. In other embodiments, the entity system 106 may transmit the keypad to a first user device 104 and transmit the authentication string to a second user device 104. For example, the entity system 106 may transmit the keypad to the user device 104, such as a laptop or desktop computer, that requested access to the application, website, or the like. At the same time, the entity system 106 may transmit the authentication string to a second user device 104, such as a smartphone.

Additionally, it should be understood that the keypad and the authentication string may be transmitted in different formats. For instance, as discussed above, the keypad may be included in a graphical user interface, which the entity system 106 may transmit to the user device 104 as part of a communication channel via an application associated with the entity or another program running on the user device 104, such as a web-browser application. On the other hand, the authentication string may be transmitted to the user device 104 using traditional contact information for the user 102. As an example, the authentication string may be transmitted to the user 102 in an email that the user 102 accesses on the user device 104 by logging into their email account through a web browser on the user device 104 or through a dedicated email application on the user device 104. As another example, the authentication string may be transmitted to the user 102 through cellular networks, such as through a text or SMS message or a phone call.

Moving to FIG. 5, the process flow 600 is also shown from the perspective of one or more personal devices associated with a user (e.g., the one or more user devices 104 associated with the user 102) and from the perspective of a system associated with an entity (e.g., the entity system 106). The process flow 600 starts from blocks 526 and 528 of process flow 500 of FIG. 4. As indicated by block 530, after receiving the numbered keypad, the user device 104 displays the keypad to the user 102 (e.g., on the display device 432). For example, the user device 104 may display the authentication GUI including the keypad to the user 102 as a follow-up GUI after the user 102 has entered in the first set of authentication credentials in a first graphical user interface.

Additionally, as indicated by block 532, after receiving the authentication string, the user device 104 displays the authentication string to the user 102. As an illustration, the user device 104 may display the authentication string to the user 102 within an application that the user 102 is requesting access to, within a dedicated authentication application, in response to the user 102 accessing a text or SMS message that includes the authentication string on the user device 104, in response to the user 102 accessing an email account that includes an email with the authentication string on the user device 104, and so on. Alternatively, in some embodiments, the user device 104 may not display the authentication string to the user 102 and may present the authentication string to the user 102 in another format. For example, if the authentication string is transmitted to the user device 104 through a voicemail, the user device 104 may play back the voicemail including the authentication string to the user 102. Further, as discussed above with respect to FIG. 4, it should be understood that, in some embodiments, the user device 104 displaying the keypad and the user device 104 displaying the authentication string may be the same user device 104, whereas in other embodiments, the user device 104 displaying the keypad may be a first user device 104 and the user device 104 displaying the authentication string may be a second user device 104.

As indicated by block 534, the user device 104 determines whether the second authentication factor has been received from the user 102. More particularly, the user device 104 displaying the GUI including the keypad determines whether the user 102 has entered a string of alphanumeric characters via the GUI. If not, the user device 104 continues to monitor for the user 102 to enter the string. In some embodiments, the user device 104 may only allow the user 102 a certain amount of time to enter the string, or the keypad and the authentication string may only be valid with the entity system 106 for a certain amount of time, after which the keypad and authentication string will expire and the user 102 must, for example, reenter their first set of authentication credentials to restart the authentication process.

On the other hand, if the user 102 has entered a string into the keypad, the user device 104 captures the string that the user 102 input into the user device 104 via the GUI. For example, the user 102 may select various buttons or other graphical widgets on the GUI, where each button or graphical widget corresponds to an alphanumeric character, and the user device 104 may record the alphanumeric characters selected by the user 102. Additionally, as indicated by block 538, the user device 104 captures the pattern of the captured string as entered into the keypad of the authentication GUI. In some embodiments, the user device 104 determines the distance on the authentication GUI between each two consecutive characters making up the captured string. For example, if the captured string is a series of five alphanumeric characters, the user device 104 determines the distance between the graphical widgets for the first and second alphanumeric characters on the interface (e.g., "distance e"), between the graphical widgets for the second and third alphanumeric characters on the interface (e.g., "distance f"), between the graphical widgets for the third and fourth alphanumeric characters on the interface (e.g., "distance g"), and between the graphical widgets for the fourth and fifth alphanumeric characters on the interface (e.g., "distance h") on the interface. In some instances, the user device 104 may measure the distance between the consecutive characters in pixels, in United States customary units, in metric units, in display screen percentage, or the like. In some instances, the user device 104 may use the absolute distances between the characters, while in other instances, the user device 104 may normalize the distances between the characters to compensate for the dimensions or size of the user device 104 (e.g., by dividing each distance by a dimension of the display device 432 of the user device 104). Alternatively, in some embodiments, the user device 104 may record where the user made inputs on the displayed keypad and transmit the locations of the inputs to the entity system 106, with the entity system 106 determining the distances between consecutive characters making up the captured string.

As indicated by block 540, the entity system 106 receives the captured string from the user device 104. After receiving the captured string, as indicated by block 542, the entity system 106 generates a hash of the captured string (e.g., in the example of FIG. 5, "Hash C"). For example, the user device 104 may input the captured string into the same encryption algorithm used at block 516 of FIG. 4. Alternatively, in other embodiments, the user device 104 may generate the hash of the captured string and transmit the hash of the captured string to the entity system 106 instead of the captured string itself.

Additionally, as indicated by block 544, the entity system 106 receives the captured pattern from the user device 104. After receiving the captured pattern, as indicated by block 546, the entity system 106 generates a hash of the captured pattern (e.g., in the example of FIG. 5, "Hash D"). In some embodiments, the entity system 106 may receive the captured pattern on the authentication interface as a series of distances on the interface between the consecutive characters making up the captured string and generates a hash from the sum of the distances. As an illustration, referring to the previous example, the entity system 106 may receive the distance e, distance f, distance g, and distance h from the user device 104; sum the distance e, distance f, distance g, and distance h; and generate the pattern hash from the sum, such as by inputting the sum into the same encryption algorithm used at block 522 of FIG. 4. Alternatively, in other embodiments, the entity system may generate a hash of each of the distances on the interface between the consecutive characters making up the captured string. Referring to the previous example, the entity system 106 may receive distance e, distance f, distance g, and distance h. The entity system 106 may then hash distance e to produce "hash e," hash distance f to produce "hash f," hash distance g to produce "hash g," and hash distance h to produce "hash h," such as by using the same encryption algorithm used at block 522 of FIG. 4. The entity system 106 may sum hash e, hash f, hash g, and hash h to produce a total hash and generate the pattern hash by inputting the total hash into an encryption algorithm, such as the encryption algorithm used at block 522 of FIG. 4. In still other embodiments, the user device 104 may generate the hash of the captured pattern (e.g., using the methods described above) and transmit the hash of the captured pattern to the entity system 106 instead of the distances between the consecutive characters making up the captured string on the interface.

As indicated by block 548, the entity system 106 generates a captured authentication code hash from the from the captured string hash and the captured pattern hash (e.g., in the example of FIG. 5, "Hash C" and "Hash D"). For example, the entity system 106 may sum Hash C and Hash D and input the sum into an encryption algorithm (e.g., the "AuthCode Hash" algorithm of block 524 of FIG. 4) to produce the captured authentication code hash. As another example, the entity system 106 may generate the captured authentication code hash by simply summing Hash C and Hash D. Alternatively, in some embodiments, the user device 104 may instead determine the captured authentication code hash (e.g., by using the methods described above) and transmit the captured authentication code hash to the entity system 106.

As indicated by block 550, the entity system 106 determines whether the final authentication code hash matches the captured authentication code hash. Accordingly, the entity system 106 retrieves the stored final authentication code hash from the data repository (e.g., the user authentication data 218 of the user data repository 216). If the captured authentication code hash does not match the final authentication code hash, the entity system 106 denies the user 102 access, as indicated by block 552. For example, the entity system 106 may deny the user 102 access to the requested application, website, or the like. In some instances, the user device 104 may accordingly display a GUI indicating that the user 102 needs to reenter the authentication string via the keypad. Alternatively, in other instances, the user device 104 may display a GUI indicating that the user 102 must restart the two-factor authentication process. On the other hand, if the captured authentication code hash matches the final authentication code hash, the entity system 106 generates a session token, as indicated by block 554. As an example, the session token may provide the user device 104 with access to the requested application, website, or the like. Accordingly, the entity system 106 transmits the session token to the user device 104, and the user device 104 initiates the session, as indicated by block 556.

It should be understood that the process flows 500 and 600 are exemplary and that in some embodiments, modifications may be made to the process flows 500 and 600. For example, in some embodiments, the entity system 106 may generate the final authentication code hash from just the pattern of the authentication string as theoretically entered into the authentication keypad, instead of from authentication string and the pattern as described with reference to FIG. 4. Similarly, the entity system 106 may generate the captured authentication code hash from just the captured pattern, instead of from the captured string and the captured pattern as described with reference to FIG. 5. As another example, in some embodiments, the entity system 106 may not use the process flows 500 and 600 as part of a two-factor authentication system. In such embodiments, the process flow 500 may accordingly begin at block 512 with fetching the screen coordinates.

FIG. 6 illustrates a representation of a graphical user interface 700 for display on a user device (e.g., user device 104), in accordance with some embodiments of the invention. For example, the graphical user interface 700 may be displayed on a smartphone, on a tablet computer, on a laptop computer, on a desktop computer, or the like.

In the embodiment of FIG. 6, the graphical user interface 700 includes both an authentication code string 702 (e.g., a string of six digits) and an authentication keypad 704. Additionally, in the embodiment of interface 700, the keypad 704 is configured as an open area with ten circular graphical widgets (e.g., buttons) containing each digit from 0 to 9. Accordingly, the user 102 can select the graphical widgets to input the authentication code string 702. For example, the interface 700 may be configured to be displayed on a touchscreen of a smartphone or tablet computer, and the user 102 may input the authentication code string 702 by touching the graphical widgets of the keypad 704. As another example, the interface 700 may be configured to be displayed on a laptop or desktop computer, and the user 102 may input the authentication code string 702 by selecting the graphical widgets using a mouse or tracking pad.

FIG. 7 illustrates a representation of the graphical user interface 700 of FIG. 6 being used to validate an authentication code, in accordance with some embodiments of the invention. As shown in FIG. 7, to determine distances on the keypad 704, the user device 104 (or the entity system 106, when determining the authentication pattern as described above with respect to FIG. 4) may use a coordinate system 706. Additionally, FIG. 7 includes arrows 708 representing what and where on the interface 700 the user 102 is selecting when inputting the authentication code string 702. As illustrated, the user 102 has correctly input the authentication code string 702 by sequentially selecting the button including the "3" (e.g., at location "A"), the button including the "7" (e.g., at location "B"), the button including the "4" (e.g., at location "C"), the button including the "0" (e.g., at location "D"), the button including the "2" (e.g., at location "E"), and the button including the "9" (e.g., at location "F"). Accordingly, the user device 104 may capture the input authentication code string "XXXXXX". To generate the captured authentication string hash, the entity system 106 (or, in some embodiments, the user device 104) may input the captured string "XXXXXX" into an encryption algorithm.

Additionally, the user device 104 may capture the pattern of the input authentication code string by determining the distance between locations A and B (e.g., "distance A-B"), the distance between locations B and C (e.g., "distance B-C"), the distance between locations C and D (e.g., "distance C-D"), the distance between locations D and E (e.g., "distance D-E"), and the distance between locations E and F (e.g., "distance E-F"). To generate the captured pattern hash, the entity system 106 (or, in some embodiments, the user device 104) may sum distance A-B, distance B-C, distance C-D, distance D-E, and distance E-F. The entity system 106 may then generate the pattern hash by inputting the sum into an encryption algorithm. Alternatively, the entity system 106 may generate the captured pattern hash by generating a hash of distance A-B (e.g., "hash A-B"), a hash of distance B-C (e.g., "hash B-C"), a hash of distance C-D (e.g., "hash C-D"), a hash of distance D-E (e.g., "hash D-E"), and a hash of distance E-F (e.g., "hash E-F"). The entity system 106 may then sum hash A-B, hash B-C, hash C-D, hash D-E, and hash E-F to produce the captured pattern hash.

To generate the captured authentication code hash, the entity system 106 may sum the hash of the captured authentication code string "XXXXXX" and the captured pattern hash and input the sum into an encryption algorithm. Alternatively, the entity system 106 may simply sum the hash of the captured authentication code string "XXXXXX" and the captured pattern hash to generate the captured authentication code hash. Additionally, in various embodiments, the entity system 106 may use a similar process for determining the final authentication code hash, which as described with reference to FIGS. 4 and 5 is the template hash the entity system 106 compares the captured authentication code hash to.

FIG. 8 illustrates another representation of a graphical user interface 800 for display on a user device (e.g., user device 104), in accordance with some embodiments of the invention. For example, the graphical user interface 800 may be displayed on a smartphone, on a tablet computer, on a laptop computer, on a desktop computer, or the like.

In the embodiment of FIG. 8, similar to interface 700, the graphical user interface 800 includes both an authentication code string 802 (e.g., a string of three digits) and an authentication keypad 804. Additionally, in the embodiment of interface 800, the keypad 804 is configured similarly to a regular numbered keypad (e.g., as displayed on a phone), except that the digits from 0 to 9 have been assigned to the buttons of the keypad 804 in a random order. As such, the user 102 may input the authentication code string "XXX" into the keypad 804 (e.g., by touching the buttons of the keypad 804 if displayed on a touchscreen, by selecting the buttons of the keypad 804 using a mouse or tracking pad), and the user device 104 may capture both the input string and the pattern of the input string similarly to the process described above with respect to FIGS. 5 and 7. From the captured string and the captured pattern, the entity system 106 may further generate the captured authentication code hash, as also described above with respect to FIGS. 5 and 7.

FIG. 9 illustrates another representation of a graphical user interface 900 for display on a user device (e.g., user device 104), in accordance with some embodiments of the invention. As an example, the graphical user interface 900 may be displayed on a smartphone.

The interface 900 includes a message 902 displaying the authentication code string (e.g., a string of five digits). For example, the message 902 may be a text or SMS message that the user device 104 received from the entity system 106, with the text or SMS message including the authentication code string. The interface 900 also includes a keypad 904. Similar to the keypad 804, the keypad 904 is configured similarly to a regular numbered keypad, except that the digits from 0 to 9 have been assigned to the buttons of the keypad 904 in a random order. As such, as an exemplary whole, the interface 900 may include the display of message 902 as part of a text or SMS message application on the user device 104 and the display of the keypad 904 as part of an application the user 102 is requesting access to, as part of a dedicated authentication application, or the like.

FIG. 10 illustrates a representation of a graphical user interface 1000 for display on a first user device (e.g., on a display 432a of a user device 104a) and a graphical user interface 1100 for display on a second user device (e.g., on a display 432b of a user device 104b), in accordance with some embodiments of the invention. As an example, as illustrated in FIG. 10, the first user device 104a may be a smartphone, and the second user device 104b may be a laptop computer.

The interface 1000 includes a message 1002 displaying the authentication code string (e.g., a string of six alphanumeric characters). For example, the message 1002 may be a text or SMS message that the user device 104 received from the entity system 106, with the text or SMS message including the authentication code string. As such, the interface 1000 may include the display of the message 1002 as part of a text or SMS message application on the user device 104. Alternatively, in other embodiments, the message 1002 may be an email message displayed as part of an email application on the user device 104, the transcription of a voicemail displayed as part of a voicemail application on the user device 104, or the like.

The interface 1100 includes a keypad 1102 that is configured as an open area with thirteen circular graphical widgets (e.g., buttons), similarly to the authentication keypad 704 of FIG. 6. However, distinct from the keypad 704, the keypad 1102 of FIG. 10 contains letters and number randomly selected and assigned to the keypad. The numbers and letters included in the keypad 1102 include the alphanumeric characters from the authentication code string "XXXXXX", as well as additional alphanumeric characters. Accordingly, the user 102 can select the graphical widgets to input the authentication code string. For example, the user 102 may input the authentication code string by selecting the graphical widgets with a cursor 1104 controlled by a mouse or tracking pad.

FIG. 11 illustrates a representation of the graphical user interfaces 1000 and 1100 of FIG. 10 used to validate an authentication code string, in accordance with some embodiments of the invention. Similar to FIG. 7, to determine distances on the keypad 1102, the user device 104b (or the entity system 106, when determining the authentication pattern as described above with respect to FIG. 4) may use a coordinate system 1106. As illustrated by arrows 1108, the user 102 has correctly input the authentication code string by sequentially selecting the six buttons corresponding to the characters of the authentication code string "XXXXXX". Accordingly, the user device 104b may capture the input authentication code string as "XXXXXX". The user device 104b may also capture the input pattern similarly to the process described above with respect to FIG. 7. Accordingly, the user device 104b may transmit the captured string and the captured pattern to the entity system 106. In some embodiments, the entity system 106 may then generate the captured authentication code hash as described above with reference to FIGS. 5 and 7. Alternatively, in other embodiments, the user device 104b may generate hashes of the captured string and the captured pattern and transmit the captured string hash and the captured pattern hash to the entity system 106.

It should be understood that FIGS. 6-11 illustrate exemplary graphical user interfaces and that other graphical user interfaces may be generated and displayed to the user 102 as part of the invention described herein. Additionally, it should be understood that the user devices illustrated in FIGS. 9-11 are exemplary user devices and that other types of user devices, as well as other combinations of user devices, may be used with the invention described herein.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the continuous authentication and encryption processes and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive of, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generation and validation of secure authentication codes, the system comprising:
   a memory device with computer-readable program code stored thereon;
   a communication device; and
   a processing device operatively coupled to the memory device and communication device, wherein the processing device is configured to execute the computer-readable program code to:
   fetch screen coordinates for a first user device;
   generate a keypad layout;
   number the keypad layout to produce an authentication keypad;
   generate an authentication string, wherein the authentication string is a series of alphanumeric characters;
   generate a final authentication code hash from the authentication string and a pattern of the authentication string as theoretically input into the authentication keypad;
   transmit the authentication keypad to the first user device;
   transmit the authentication string to a second user device;
   generate a captured authentication code hash from a captured string and a captured pattern from the first user device, wherein the captured string is a series of alphanumeric characters input by a user into the authentication keypad on the first user device and the captured pattern is a pattern of the captured string as input by the user into the authentication keypad on the first user device;
   compare the final authentication code hash to the captured authentication code hash; and
   in response to the final authentication code hash matching the captured authentication code hash, transmit a session token to the first user device or the second user device.

2. The system of claim 1, wherein fetching the screen coordinates comprises determining specifications of a display screen of the first user device.

3. The system of claim 1, wherein the authentication string is a randomly-generated number of N length.

4. The system of claim 1, wherein the processing device is further configured to:
   determine a first set of hashes comprising a hash of a distance between each two consecutive alphanumeric characters of the authentication string on the authentication keypad;
   sum the hashes in the first set of hashes to produce a first sum;
   generate a hash of the first sum to produce an authentication pattern hash that is used to generate the final authentication code hash;
   determine a second set of hashes comprising a hash of a distance between each two consecutive alphanumeric characters of the captured string as input by the user into the authentication keypad;
   sum the hashes in the second set of hashes to produce a second sum; and
   generate a hash of the second sum to produce a captured pattern hash that is used to generate the captured authentication code hash.

5. The system of claim 4, wherein the distance between each two consecutive alphanumeric characters of the authentication string on the authentication keypad and the distance between each two consecutive alphanumeric characters of the captured string as input by the user into the authentication keypad are measured in one of pixels, United States customary units, metric units, or display screen percentage.

6. The system of claim 4, wherein the distance between each two consecutive alphanumeric characters of the authentication string on the authentication keypad and the distance between each two consecutive alphanumeric characters of the captured string as input by the user into the authentication keypad is a normalized distance that compensates for a dimension of a display screen of the first user device.

7. The system of claim 1, wherein generating the final authentication code hash comprises:
   generating a first hash of the authentication string;
   generating a second hash of the pattern of the authentication string; and
   generating a hash of a sum of the first hash and the second hash.

8. The system of claim 7, wherein generating the captured authentication code hash comprises:
   generating a third hash of the captured string;
   generating a fourth hash of the captured pattern; and
   generating a hash of a sum of the third hash and the fourth hash.

9. The system of claim 1, wherein the first user device is the same as the second user device.

10. The system of claim 1, wherein the first user device is different from the second user device.

11. The system of claim 1, wherein generating the captured authentication code hash comprises:
  receiving the captured string and the captured pattern from the first user device; and
  determining the captured authentication code hash based on the received captured string and received captured pattern.

12. The system of claim 1, wherein generating the captured authentication code hash comprises receiving the captured authentication code hash from the first user device.

13. The system of claim 1, wherein the processing device is further configured to:
  receive a first-factor authentication input from the first user device or the second user device; and
  verify an accuracy of the first-factor authentication input, wherein the processing device is configured to fetch the screen coordinates for the user device in response to successful verification of the first-factor authentication input.

14. A computer-implemented method for continuous authentication and encryption, the method comprising:
  fetching screen coordinates for a first user device;
  generating a keypad layout;
  numbering the keypad layout to produce an authentication keypad;
  generating an authenticating string, wherein the authentication string is a series of alphanumeric characters;
  generating a final authentication code hash from the authentication string and a pattern of the authentication string as theoretically input into the authentication keypad;
  transmitting the authentication keypad to the first user device;
  transmitting the authentication string to a second user device;
  generating a captured authentication code hash from a captured string and a captured pattern from the first user device, wherein the captured string is a series of alphanumeric characters input by a user into the authentication keypad on the first user device and the captured pattern is a pattern of the captured string as input by the user into the authentication keypad on the first user device;
  comparing the final authentication code hash to the captured authentication code hash; and
  in response to the final authentication code hash matching the captured authentication code hash, transmitting a session token to the first user device or the second user device.

15. The computer-implemented method of claim 14, further comprising:
  determining a first set of hashes comprising a hash of a distance between each two consecutive alphanumeric characters of the authentication string on the authentication keypad;
  summing the hashes in the first set of hashes to produce a first sum;
  generating a hash of the first sum to produce an authentication pattern hash that is used to generate the final authentication code hash;
  determining a second set of hashes comprising a hash of a distance between each two consecutive alphanumeric characters of the captured string as input by the user into the authentication keypad;
  summing the hashes in the second set of hashes to produce a second sum; and
  generating a hash of the second sum to produce a captured pattern hash that is used to generate the captured authentication code hash.

16. The computer-implemented method of claim 14, wherein generating the final authentication code hash comprises:
  generating a first hash of the authentication string;
  generating a second hash of the pattern of the authentication string;
  generating a hash of a sum of the first hash and the second hash; and wherein generating the captured authentication code hash comprises:
  generating a third hash of the captured string;
  generating a fourth hash of the captured pattern; and
  generating a hash of a sum of the third hash and the fourth hash.

17. The computer-implemented method of claim 14, wherein the first user device is the same as the second user device.

18. The computer-implemented method of claim 14, wherein generating the captured authentication code hash comprises:
  receiving the captured string and the captured pattern from the first user device; and
  determining the captured authentication code hash based on the received captured string and the received captured pattern.

19. The computer-implemented method of claim 14, further comprising:
  receiving a first-factor authentication input from the first user device or the second user device; and
  verifying an accuracy of the first-factor authentication input, wherein fetching the screen coordinates for the user device is in response to successful verification of the first-factor authentication input.

20. A computer program product for generation and validation of secure authentication codes with at least one non-transitory computer-readable medium having computer-readable program code portions embodied therein, the computer-readable program code portions comprising:
  an executable portion configured for fetching screen coordinates for a first user device;
  an executable portion configured for generating a keypad layout;
  an executable portion configured for numbering the keypad layout to produce an authentication keypad;
  an executable portion for generating an authentication string, wherein the authentication string is a series of alphanumeric characters;
  an executable portion for generating a final authentication code hash from the authentication string and a pattern of the authentication string as theoretically input into the authentication keypad;
  an executable portion for transmitting the authentication keypad to the first user device;
  an executable portion for transmitting the authentication string to a second user device;
  an executable portion for generating a captured authentication code hash from a captured string and a captured pattern from the first user device, wherein the captured string is a series of alphanumeric characters input by a user into the authentication keypad on the first user device and the captured pattern is a pattern of the captured string as input by the user into the authentication keypad on the first user device;

an executable portion for comparing the final authentication code hash to the captured authentication code hash; and an executable portion for, in response to the final authentication code hash matching the captured authentication code hash, transmitting a session token to the first user device or the second user device.

* * * * *